(12) United States Patent
Segnit

(10) Patent No.: US 10,931,127 B2
(45) Date of Patent: Feb. 23, 2021

(54) MODULAR CHARGING SYSTEM AND WALL-MOUNTED CHARGING DEVICE AND MODULAR POWER DEVICES

(71) Applicant: Seymour Segnit, Cornwall on Hudson, NY (US)

(72) Inventor: Seymour Segnit, Cornwall on Hudson, NY (US)

( * ) Notice: Subject to any disclaimer, the term of this patent is extended or adjusted under 35 U.S.C. 154(b) by 0 days.

(21) Appl. No.: 16/898,366

(22) Filed: Jun. 10, 2020

(65) Prior Publication Data

US 2020/0373772 A1 Nov. 26, 2020

Related U.S. Application Data

(63) Continuation of application No. 15/950,081, filed on Apr. 10, 2018, now abandoned.

(60) Provisional application No. 62/457,510, filed on Feb. 10, 2017.

(51) Int. Cl.
*H02J 7/00* (2006.01)

(52) U.S. Cl.
CPC .................. *H02J 7/0045* (2013.01)

(58) Field of Classification Search
CPC ......... H02J 7/0045; H02J 7/0021; H02J 7/025
USPC .......................... 320/108, 109, 115, 117, 138
See application file for complete search history.

(56) References Cited

U.S. PATENT DOCUMENTS

| | | | | |
|---|---|---|---|---|
| RE46,391 E | * | 5/2017 | Jung | H02J 50/12 |
| 10,562,404 B1 | * | 2/2020 | Khaligh | H02M 7/797 |
| 2011/0127959 A1 | * | 6/2011 | McGary | H02J 7/0027 |
| | | | | 320/114 |
| 2012/0146576 A1 | * | 6/2012 | Partovi | H02J 50/80 |
| | | | | 320/108 |
| 2012/0235636 A1 | | 9/2012 | Partovi | |
| 2014/0084862 A1 | | 3/2014 | Kawaguchi | |
| 2015/0326060 A1 | * | 11/2015 | Young | H02J 7/0077 |
| | | | | 320/108 |
| 2016/0056649 A1 | * | 2/2016 | Chen | H01R 31/06 |
| | | | | 320/111 |
| 2016/0056664 A1 | | 2/2016 | Partovi | |
| 2017/0110910 A1 | * | 4/2017 | Zeine | H02J 50/80 |
| 2017/0197517 A1 | | 7/2017 | Jamieson | |
| 2018/0019610 A1 | | 1/2018 | Gu | |

(Continued)

OTHER PUBLICATIONS indiegogo.com Crowdfunding Website, Slimger—Ultra Slim Charger for Mobile Devices, website: https://www.indiegogo.com/projects/slimger-ultra-slim-charger-for-mobile-devices#/ (last accessed Jun. 11, 2020).

(Continued)

*Primary Examiner* — Phallaka Kik
(74) *Attorney, Agent, or Firm* — The Richards Law Firm LLC; William B. Richards, Esq.

(57) ABSTRACT

The present invention relates to a modular charging system including a wall-mounted outlet-preserving charger for charging additional accessories such as battery blocks, wireless device chargers, supporting chargers for wearable devices such as watches, and car chargers, each for use independently or in combination with electronic devices. The present invention typically includes a wall charger with one or more electrical outlets on the front face so the use of the wall outlet is not lost. The wall charger of the present invention is suitable for use in any major country and may be adapted to the outlet configuration and voltage of those countries.

16 Claims, 33 Drawing Sheets

(56) References Cited

U.S. PATENT DOCUMENTS

2018/0166906 A1\*  6/2018  Malhotra ............... H02J 50/50
2019/0097448 A1   3/2019  Partovi
2020/0065536 A1\*  2/2020  Utykanski ............... H02J 7/00

OTHER PUBLICATIONS amazon.com Ordering Website, Stack Pack Magnetic Wireless Charging Receiver Case, Removeable (sic) Battery Pack, Wall Charger, website: https://smile.amazon.com/iPhone-Stack-Pack-Black-Removeable/dp/B018VK9IN0?th=1 (last accessed Jun. 11, 2020).

\* cited by examiner

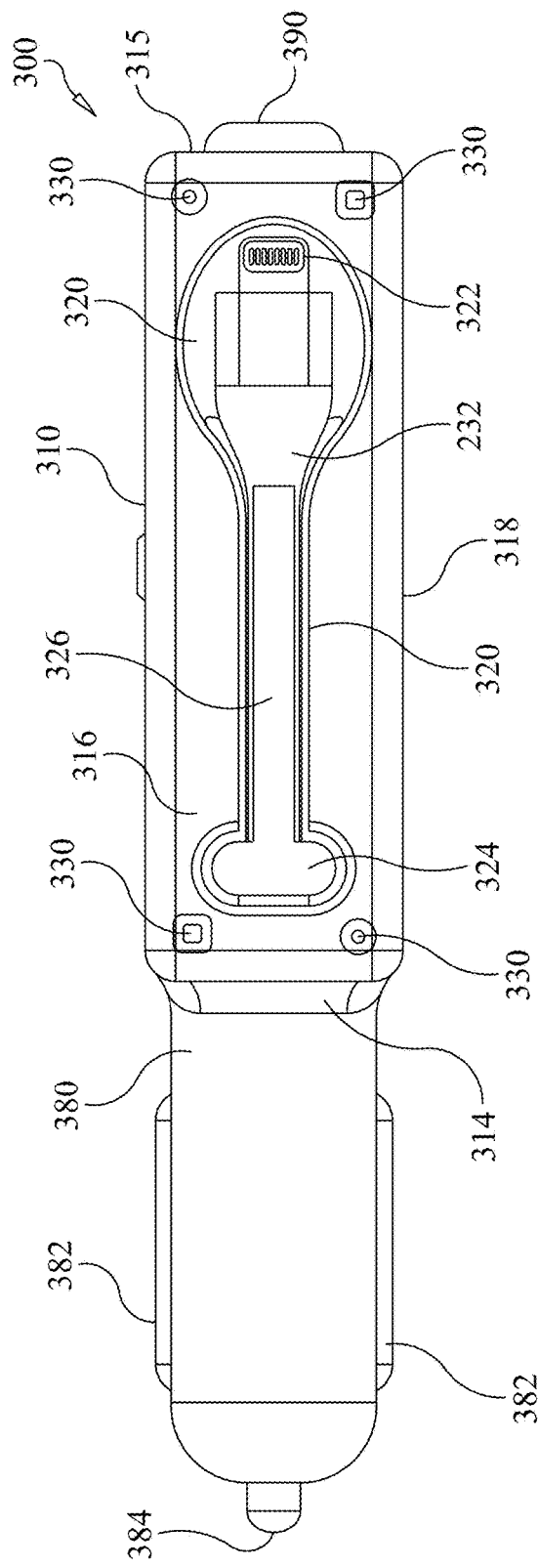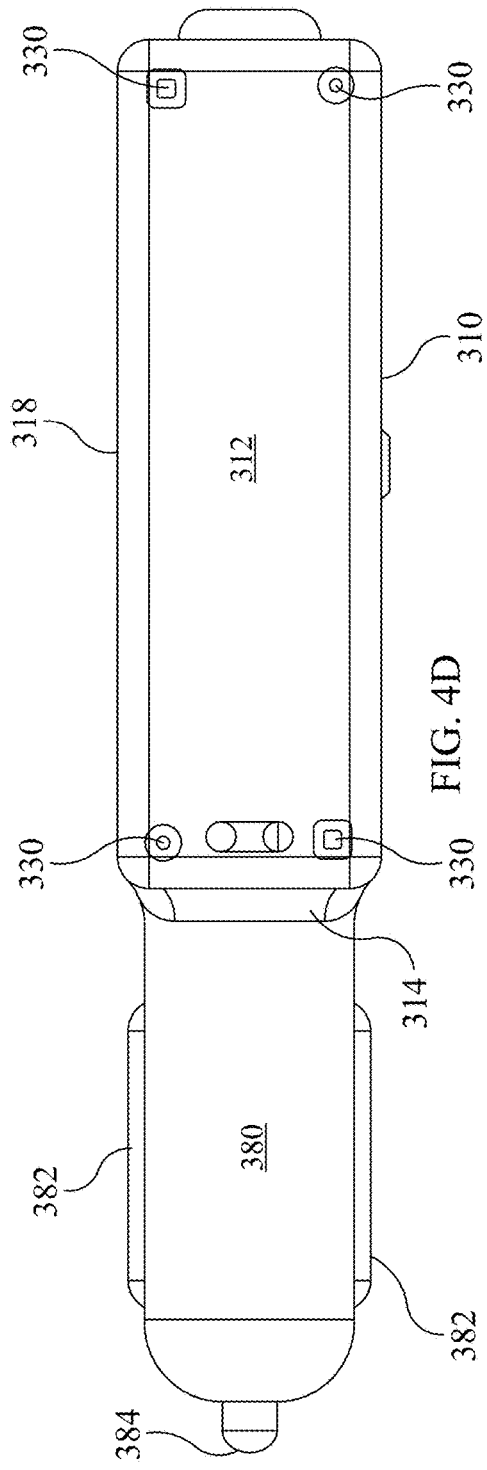
FIG. 4C
FIG. 4D

MODULAR CHARGING SYSTEM AND WALL-MOUNTED CHARGING DEVICE AND MODULAR POWER DEVICES

CROSS-REFERENCES TO RELATED APPLICATIONS

This application claims priority to U.S. application Ser. No. 15/950,081 (now abandoned), filed Apr. 10, 2018 entitled "Modular Charging and System Wall-Mounted Charging Device and Modular Power Devices", which application claims priority to U.S. Prov. App. No. 62/457,510, filed Feb. 10, 2017 entitled "Modular Charging and System Wall-Mounted Charging Device and Modular Outlet Extended". Both are incorporated by reference.

FIELD

The present invention relates to modular charging systems, including wall-mounted outlet-preserving chargers for powering and charging additional accessories for use with electronic components such as battery blocks, wireless device chargers, supporting chargers for wearable devices such as watches, and car chargers, each for use independently or in combination with electronic devices.

BACKGROUND

With many charging systems for electronic devices, the transformer base unit is hardwired to the cable and is suitable only for use with a single type of electronic device. In other configurations, the base unit includes a standardized bus port, such as a Universal Serial Bus (USB) or other manufacturer-specific port. With the proliferation of mobile phones, e-readers, tablets, notepad computers, and other portable electronic devices, the storage and sorting of charges has become burdensome. Sorting base units and cables for any number of electronic devices consumes time, storage space, and space on a wall outlet or on a power strip.

SUMMARY

In one aspect, a novel wall-mounted charging device and modular outlet extender is featured which may be inserted into a standard wall outlet without additional wires and which provides a platform for charging an electrical device without intruding into the environment of the user. The wall-mounted charging device and modular outlet extender provides a housing, at least one electrical outlet, at least one set of electrical connection prongs, and an auxiliary charging port formed on a top wall of the housing. The top wall supports an electrical device while it is connected to the auxiliary charging port for charging. In a further aspect, the wall-mounted charging device and modular outlet extender may also include a removable charging tip extending from the auxiliary charging port formed on the top wall, and a second auxiliary port formed on a bottom wall of the housing. In a further aspect, the device may also include a plurality of auxiliary ports formed in the bottom wall of the housing and one or more auxiliary ports formed in sidewalls of the housing. The device may generally also include a power supply unit providing low-voltage power to the auxiliary ports so that low-voltage power is provided to the electrical device for charging. The device may also include other features in the housing such as a GFI (ground fault interrupter), a surge protector, a mechanical power interruption switch, a WiFi extender, a Thunderbolt® (Apple, Inc.) connection, a USB connector, a Micro USB connector, an HDMI™ (High-Definition Multimedia Interface) connector, an Ethernet connector, any other industry-standard connector, or may include a remote-control unit or an audio connector. Also included may be modular charging devices such as battery blocks, wireless device chargers, supporting chargers for wearable devices such as watches, and car chargers. Each component may be used to charge an electronic device either alone or in conjunction with other components. Also included may be one or more electrical outlets on a front face so that the use of the wall outlet is not lost. The wall charger is suitable for use in any major country and may be adapted to the outlet configuration and voltage of those countries.

In a further aspect, a modular system of charging devices is configured to be configured to join separate charging devices. The system comprises a first charging device and a second charging device. The first charging device comprises first and second opposed major surfaces and first and second opposed minor surfaces, an electrical charging port on at least one minor surface, the electrical charging port adapted to connect to a digital device, a magnetic connector suitable for physically connecting the first charging device to the second charging device, a first electrical connection for electrically connecting the first charging device to the second charging device, a charge storage mechanism electrically connected to the electrical charging port, the magnetic connector, and the first electrical connection, at least one electrical connection located on the first major surface, and at least one electrical plug extending from the second major surface. The second charging device comprises first and second opposed major surfaces and first and second opposed minor surfaces, an electrical charging port for connecting a digital device on at least one minor surface, a magnetic connector adapted to physically connect to the first charging device, and a second electrical connection adapted to electrically connect to the first electrical connection of the first charging device.

In a further aspect, the modular system of charging devices further comprises a third charging device, the third charging device comprising a base, the base comprising one inclined major surface, the inclined major surface inclined from the base and a second major surface, a wireless coil, the wireless coil adapted to electrically charge a digital device proximate the inclined major surface, and a magnetic connector adapted to physically connect to the first and second charging devices.

DESCRIPTION OF THE DRAWINGS

A more complete appreciation of the invention and the various embodiments thereof will be readily obtained as the same becomes better understood by reference to the following detailed description when considered in connection with the accompanying drawings. The drawings are incorporated in, and constitute part of, this specification, illustrate several embodiments consistent with the invention and, together with the description, serve to explain the principles of the invention.

FIG. 4C is a bottom view of an accessory car charger suitable for use with a modular charging system in accordance with the present invention.

FIG. 4D is a top view of an accessory car charger suitable for use with a modular charging system in accordance with the present invention.

DESCRIPTION

The wall mounted charging device of the present invention enables a charging station to be provided on a wall outlet without obstructing the receptacle of the outlet. The charging device of the present invention provides a utilitarian and aesthetically pleasing solution to the issue of blocked receptacles, wire tangles, and unsightly wall-mounted chargers. The charging device of the present invention may be doubled up to provide two or more charging stations. The device may also include multiple charging tips to provide flexibility in charging devices of different generations and different manufacturers, essentially any rechargeable device may be installed on the wall charger with a suitable charging tip installed.

Figure 1A:
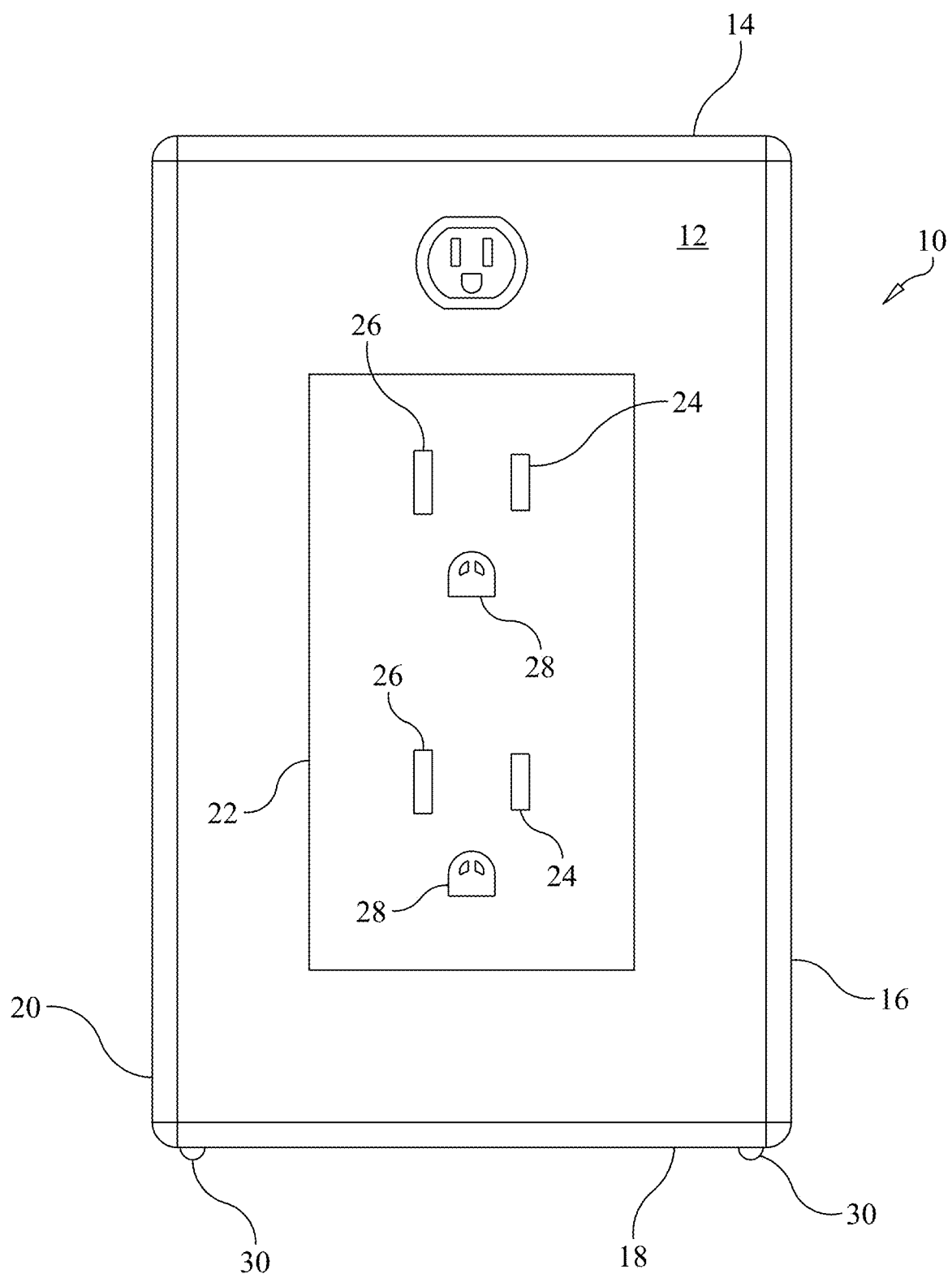
FIG. 1A is a front view of a wall-mounted charging device and modular outlet extender in accordance with the present invention.

FIG. 1A shows a wall-mounted charging device and modular outlet extender of the present invention in which the charging device 10 includes a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and a ground receptacle 28. In the top wall 14, a receptacle (not shown) is formed for receiving any of a number of charging tips suitable for use with various electronic components. While the 120V AC receptacle configuration shown is typically suitable for use in North America, it is within the scope of the invention to accommodate voltages and receptacle configurations for worldwide usage. The charging device 10 is mounted to a wall outlet and protrudes from the wall a minimal distance. The receptacle, with a charging tip installed, forms a charging dock that allows an electronic device to be placed atop the charging device 10 so that the device is charged in a convenient location without obstructing the outlets on outlet plate.

The top surface receptacle is formed for receiving a number of charging tips suitable for use with various electronic components. A charging tip installed forms a charging dock that enables an electronic device to be placed atop the charging device so the device is charged in a convenient location without obstructing the outlets of an outlet plate. Also, on the top and/or bottom surfaces are electronic connections 30 to be matched to connections on modular components as set forth hereinbelow. The electronic connections may be magnetized for a positive connection between the base and the modular components. Positive and negative connections may be formed in either or both of the top surface 14 and bottom surface 18. Modular components may be connected to the top surface 14 and/or bottom surface 18 for charging power storage in those modular components or allowing the attached modular components to power connected devices.

Figure 1B:
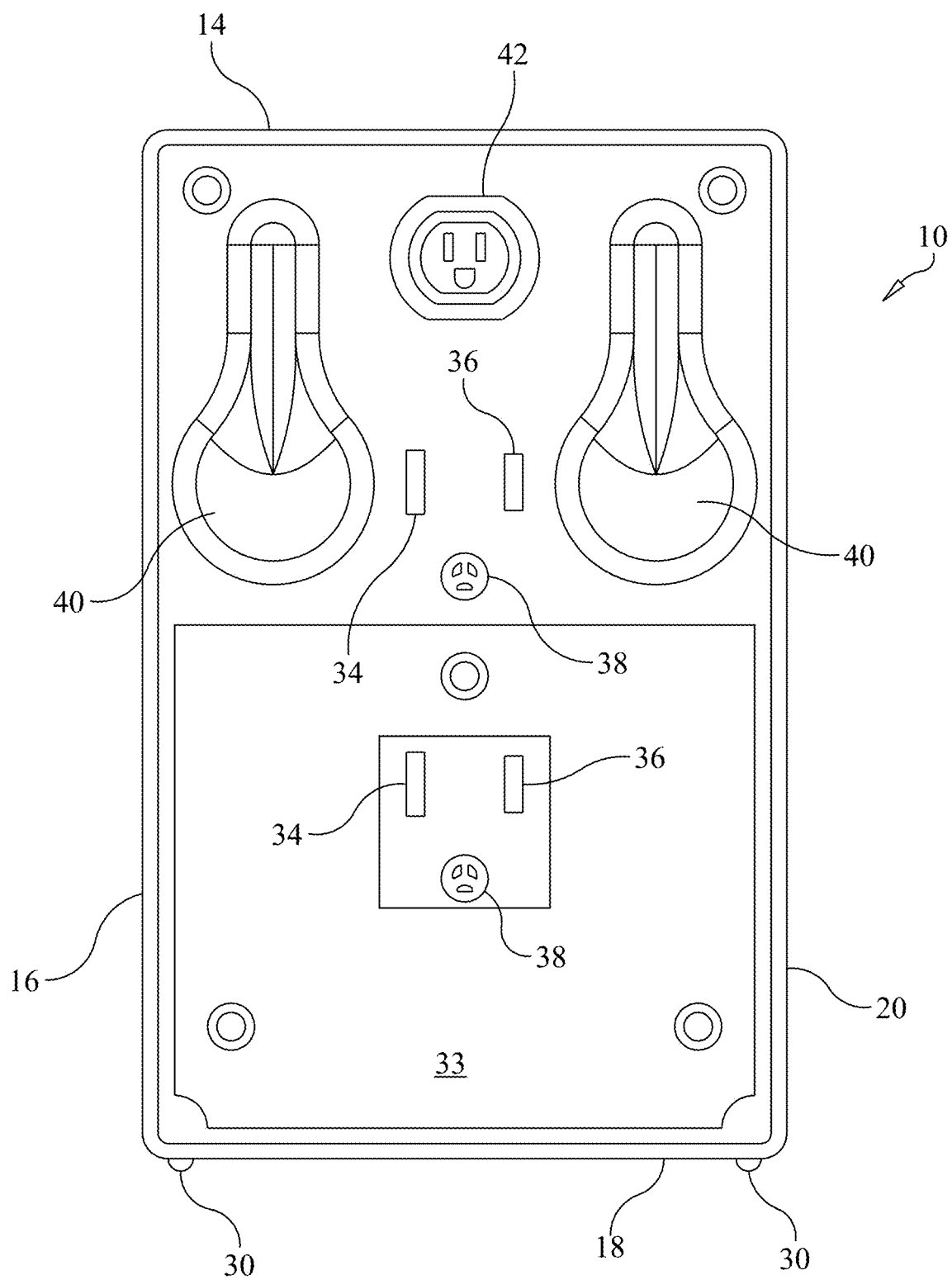
FIG. 1B is a rear view of a wall-mounted charging device and modular outlet extender in accordance with the present invention.

FIG. 1B shows a rear face 33 of a wall-mounted charging device and modular outlet extender 10 in which the charging device 10 includes a top wall 14, a right-side wall 16, a bottom wall 18, and a left side wall 20. The rear face 33 includes an outlet plate that includes two sets of connections, each with a 120V AC "hot" blade 34, a neutral blade 36, and ground blade 38. While the 120V AC configuration shown is typically suitable for use in North America, it is within the scope of the invention to accommodate voltages and receptacle configurations for worldwide usage. The rear face 33 may include retaining sections 40 for charge tips and a tip release button 42. The bottom wall 18 includes electronic connections 30 to be matched to connections on modular components as set forth hereinbelow.

Figure 1C:
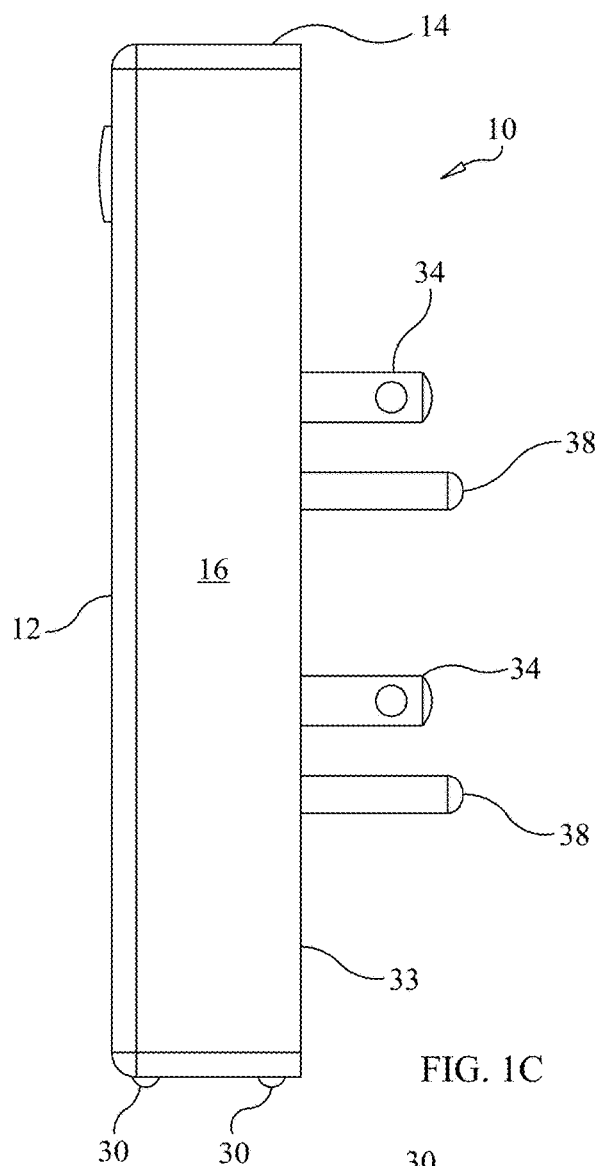
FIG. 1C is a side view of a wall-mounted charging device and modular outlet extender in accordance with the present invention.

FIG. 1C shows a right face 16 of a wall-mounted charging device and modular outlet extender 10 in which the charging device 10 includes a top wall 14, a right-side wall 16, a bottom wall 18, and a left side wall 20 (not shown). The rear face includes two sets of connections, each with a 120V AC "hot" blade 34, a neutral blade 36, and ground blade 38. The bottom wall 18 includes electronic connections 30 to be matched to connections on modular components as set forth hereinbelow.

Figure 1D:
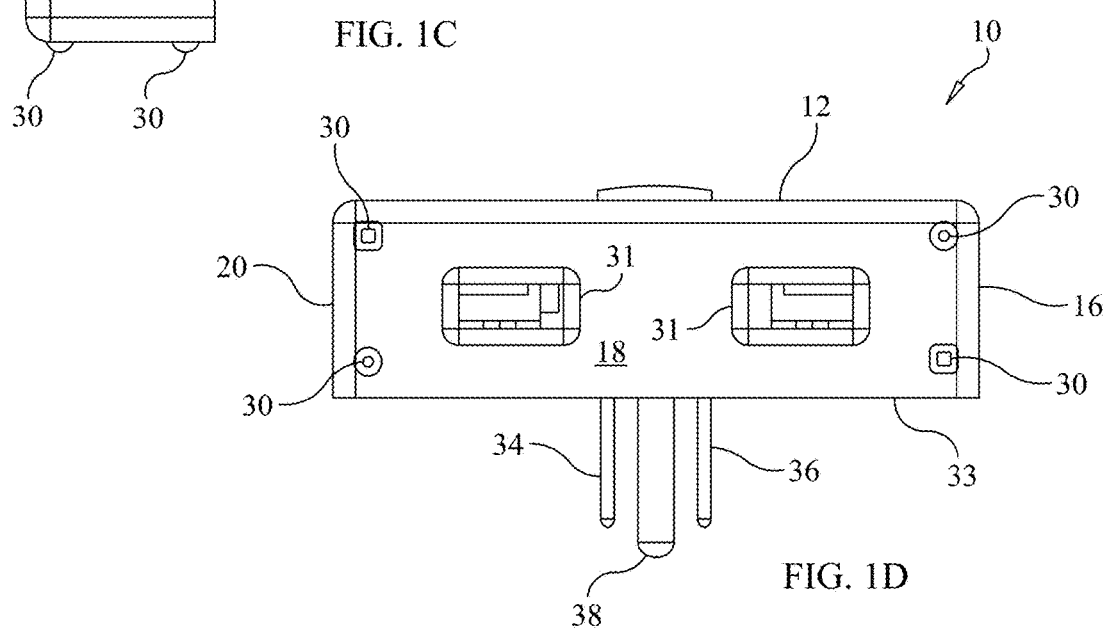
FIG. 1D is a bottom view of a wall-mounted charging device and modular outlet extender in accordance with the present invention.

FIG. 1D shows a bottom face 18 of a wall-mounted charging device and modular outlet extender 10 in which the charging device 10 includes, a top wall 14 (not shown), a right-side wall 16, a bottom wall 18, and a left side wall 20. The rear face includes an two sets of connections, each with a 120V AC "hot" blade 34, a neutral blade 36 and ground blade 38. Bottom wall 18 includes electronic connections 30 to be matched to connections on modular components as set forth hereinbelow. Also included in bottom face 18 are connection ports 31, such as USB ports of any type. USB-A or USB-C are typically preferred; however, any desired port mat be used.

Figure 1E:
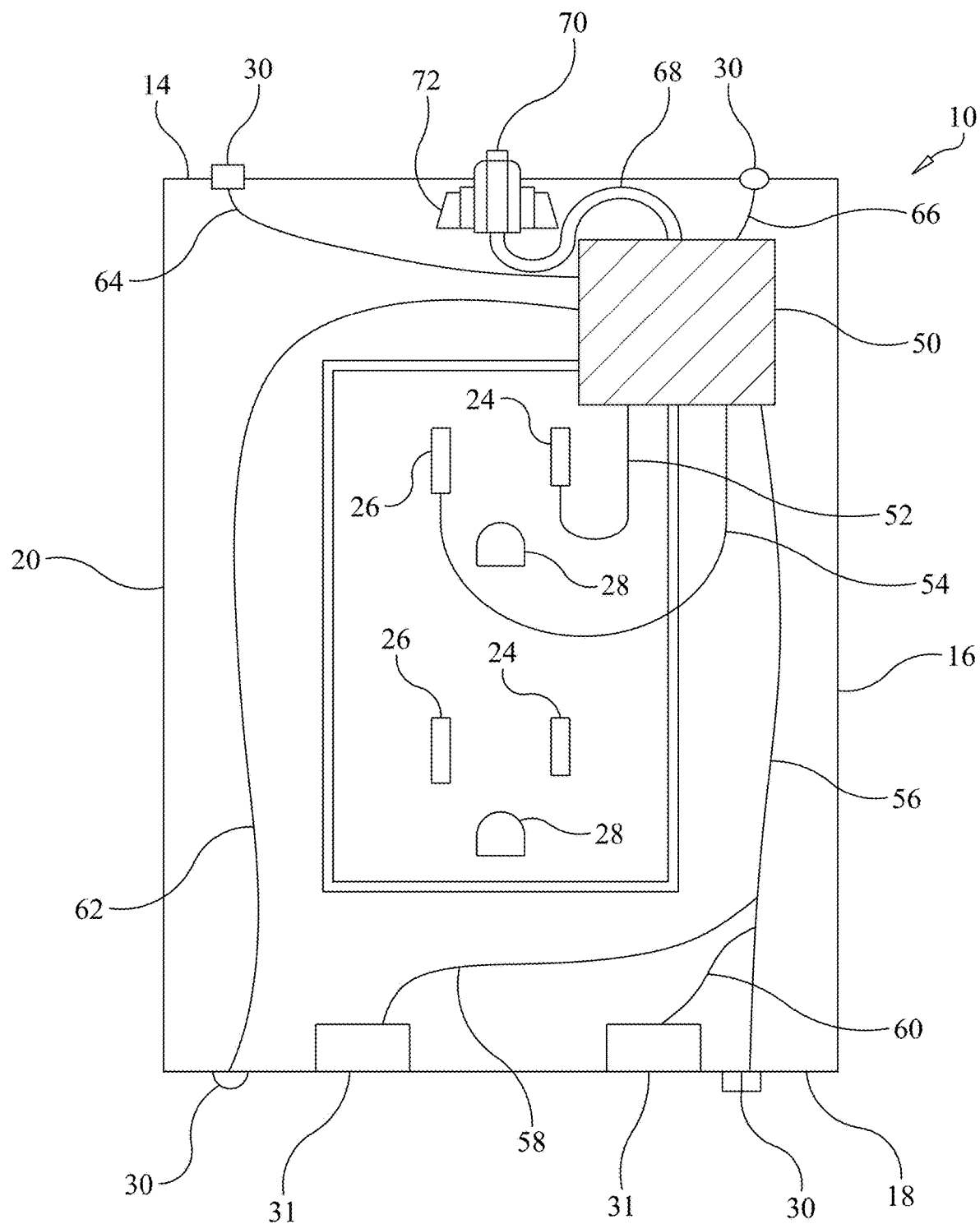
FIG. 1E is a front schematic view of a wall-mounted charging device and modular outlet extender showing the internal electronics in accordance with the present invention.

FIG. 1E shows a schematic view of a wall-mounted charging device and modular outlet extender of the present invention in which the charging device 10 includes a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and ground receptacle 28. In the top wall 14, a receptacle (not shown) is formed for receiving any of a number of charging tips suitable for use with various electronic components. While the 120V AC and receptacle configuration shown is typically suitable for use in North America, it is within the scope of this invention to accommodate voltages and receptacle configurations for worldwide usage. The charging device 10 is mounted to a wall outlet and protrudes from the wall by a minimal distance. The receptacle, with a charging tip installed, forms a charging dock that allows an electronic device to be placed atop the charging device so that the device is charged in a convenient location without obstructing the outlets on outlet plate. The top surface receptacle 72 is formed for receiving a number of charging tips 70 suitable for use with various electronic components. A charging tip 70 installed forms a charging dock that allows an electronic device to be placed atop charging device so that the device is charged in a convenient location without obstructing the outlets on outlet plate. As discussed below, the side sections of tip 70 may include serrated sections which a congruent toothed section within the receptacle 72 such that a release button 42 disengages the serrated section from the toothed section in the receptacle 72 to allow the tip to be replaced. Also, on the top and/or bottom surfaces are electronic connections 30 to be matched to connections on modular components as set forth hereinbelow. The electronic connections may be magnetized for a positive connection between the base and the modular components. Positive and negative connections may be formed in either or both of the top surface 14 and bottom surface 18. Modular components may be connected to the top surface 14 and/or bottom surface 18 for charging power storage in those modular components or allowing the attached modular components to power connected devices. A power bank is a device that stores power in a Li-Ion battery. It is being increasingly used as reserve charger for hand held/portable devices like mobile phones and tablets. A typical power bank includes a charging circuit to implement the charging logic for a Li-Ion battery. A battery protection circuit may be included to inhibit overcharge and implement overtemperature protections during charging and inhibit overdischarge. A boost converter steps up the incoming 3V-4.2V battery voltage to 5V. Also included may be controller functions to monitor and control output voltage, measure battery voltage and monitor load current, and illuminate status LEDs to display battery level or other statuses.

A power adapter 50 such as an iWatt iW1691-03 adapter having an AC input of 90-264 VAC and an output of 5V at 2.1 AMPs may be used. Any other suitable power adapter may be used. Leads 52, 54 connect the power adaptor 50 to receptacle 24, 26 and blades 34, 36. The power adapter 50 is also connected to leads 54, 56, 58, 60, and 62 to power the connections 30, 31 on the bottom wall 18. Leads 64, 66 power connections 30 on the top wall 14 and lead 68 powers connection port 72, into which a tip 70 may be inserted. Any other low-voltage connections formed in the front face, top wall, sidewalls or bottom wall may be connected to the power adapter 50.

The specifications for the iW1691-03 adapter are shown in Table 1 below:

TABLE 1

| Description | Symbol | Min | Typ | Max | Units |
|---|---|---|---|---|---|
| Input | | | | | |
| Voltage | $V_{in}$ | 90 | | 264 | $V_{AC}$ |
| Frequency | $f_{LINE}$ | 47 | 50/60 | 63 | Hz |
| No-load power input (230 $V_{AC}$) | | | | 150 | mW |
| Output | | | | | |
| Output voltage | $V_{out}$ | 4.85 | | 5.25 | V |
| Output Current | $I_{out}$ | 0 | | 2.1 | A |
| Output Ripple Voltage | $V_{RIPPLE}$ | | | 100 | $mV_{P\_P}$ |
| Total Output Power | | | | | |
| Continuous output power | $P_{out}$ | | 10.5 | | W |
| Over-current protection | $I_{OUT\,MAX}$ | | | 2.5 | A |
| Active mode protection | $\eta$ | 80 | | | % |

While the power adapter chip 50 is preferably an adapter, any of a ground fault interrupter, a surge protector, a mechanical power interruption switch, or a WiFi extender may be included. The power supply may also be connected to a remote-control unit, Thunderbolt®, USB, Micro USB, HDMI, or Ethernet connector formed in one of the walls. Generally, power controllers include sensor ICs, cell controller ICs, and charger ICs that provide configuration flexibility with factory-programmable parameters such as output voltage and input over-voltage protection, constant current (CC) and constant voltage (CV) charge modes, trickle charge current and trickle charge voltage thresholds, EOC current and timeout, verification filter timing, and recharge and thermal foldback thresholds. Other suitable controllers include the MC34671 and MC34674 single cell battery travel charger available from NXP Semiconductors. AC-DC controllers which include Switched Mode Power Supply (SMPS) controllers, automatic discharge for low-power X capacitors, and Synchronous Rectifier (SR) controllers for switched mode power supplies with adaptive gate drive may also be preferred.

Figure 1F:
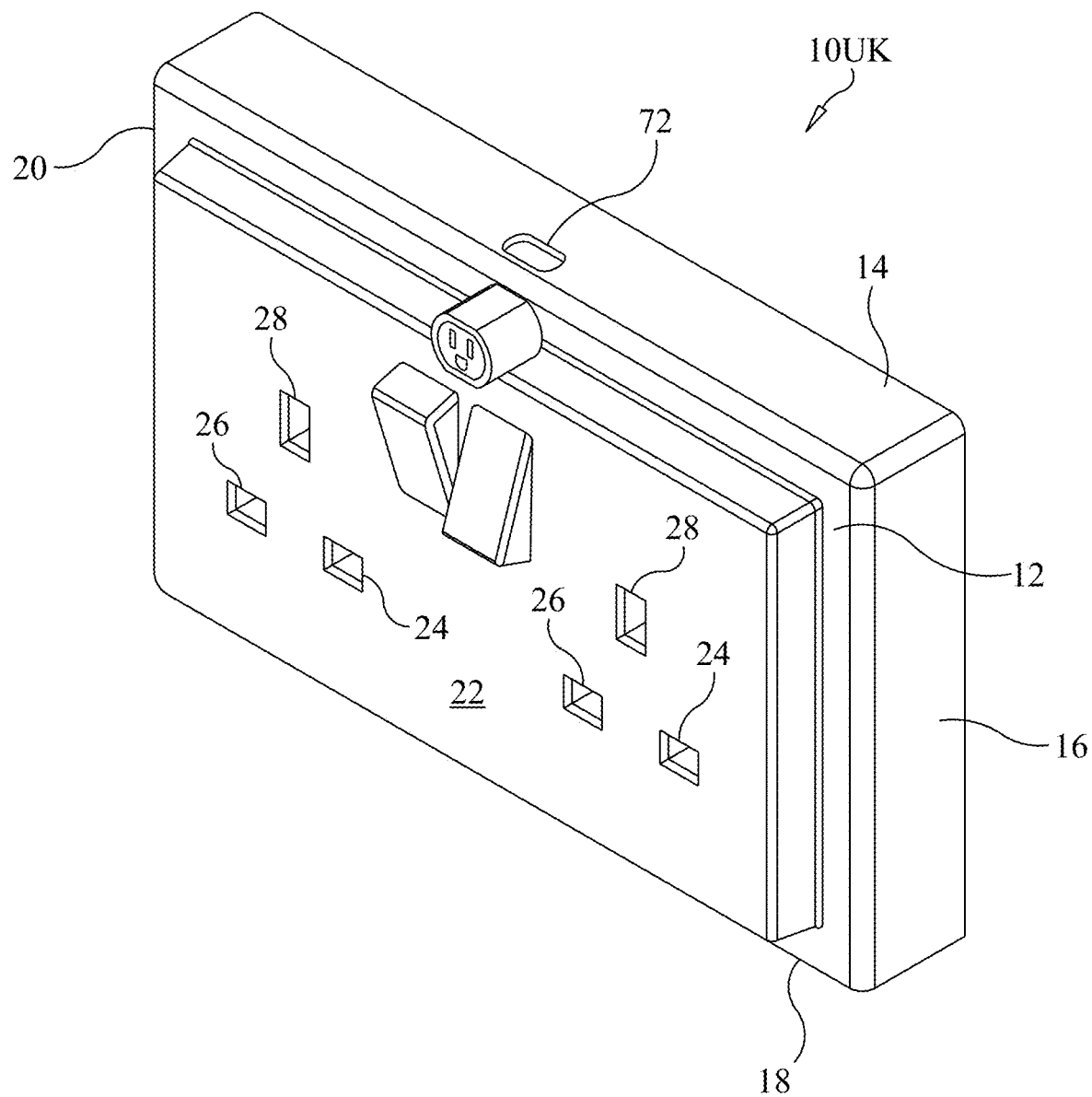
FIG. 1F is a perspective view of a wireless charger for use with a wall-mounted charging device and modular outlet extender in accordance with the present invention.

FIG. 1F shows a UK style wall-mounted charging device and modular outlet extender of the present invention in which the charging device 10UK includes a front face 12, a top wall 14, a right-side wall 16, a bottom wall 18, and a left side wall 20. The front face includes an outlet plate 22 that includes two outlets, each with a 240V AC "hot" receptacle 24, a neutral receptacle 26, and a ground receptacle 28. In the top wall, a receptacle 72 is formed for receiving any of a number of charging tips suitable for use with various electronic components. While the 240V AC and receptacle configuration shown is typically suitable for use in the United Kingdom, it is within the scope of the invention to accommodate voltages and receptacle configurations for world-wide usage.

Figure 1G:
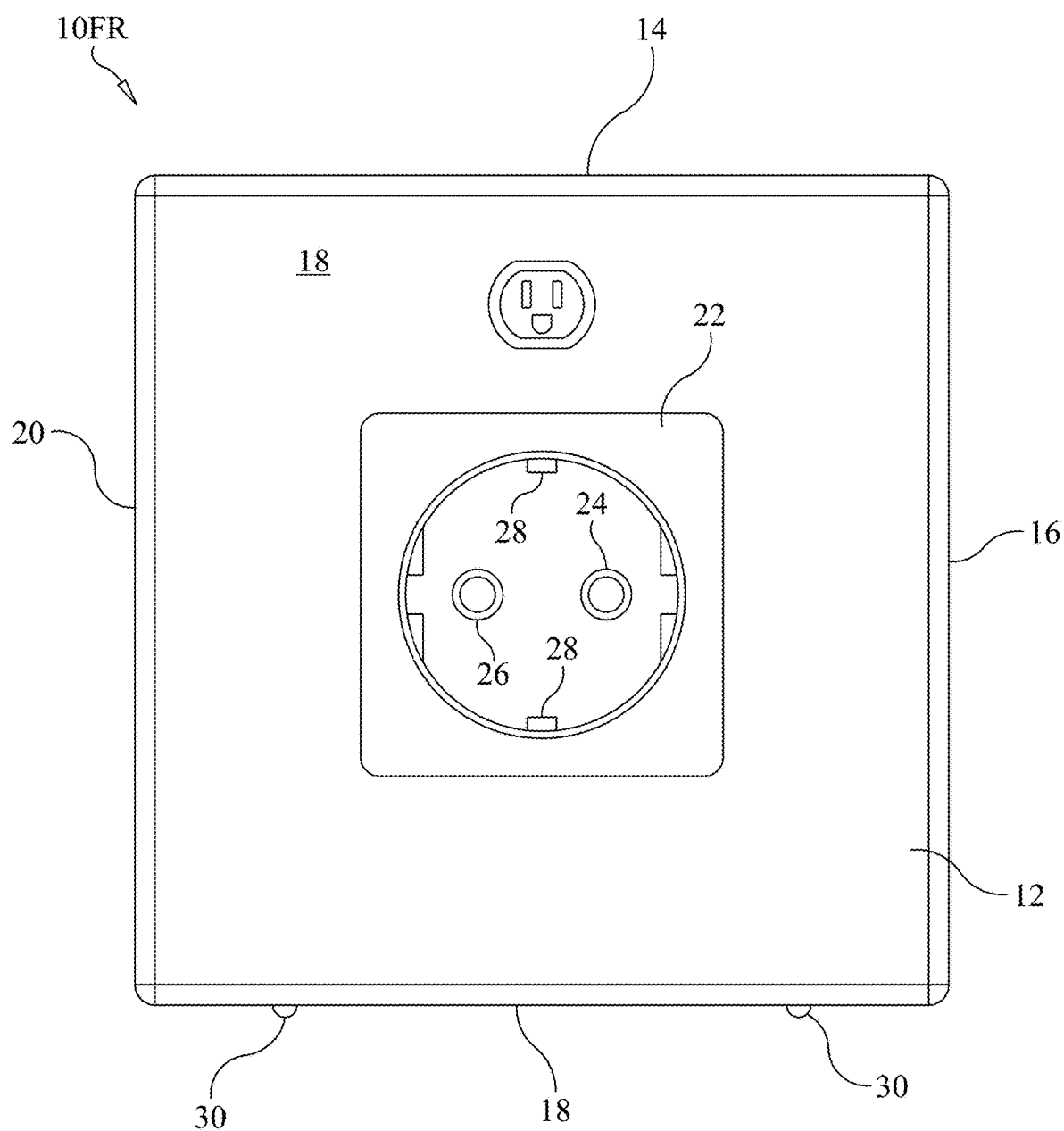
FIG. 1G is a view of a wireless charger for use with a wall-mounted charging device and modular outlet extender in accordance with the present invention.

FIG. 1G shows a French/Belgium style wall-mounted charging device and modular outlet extender of the present invention in which the charging device 10FR includes a front face 12, a top wall 14, a right-side wall 16, a bottom wall 18, and a left side wall 20. The front face 12 includes an outlet plate 22 that includes an outlet, each with a 230V AC "hot" receptacle 24, a neutral receptacle 26, and ground receptacle 28. In the top wall 14, a receptacle (not shown) is formed for receiving any of a number of charging tips suitable for use with various electronic components. The bottom face 18 includes electrical connectors 30 and optionally universal type connectors (not shown). While the 230V AC and receptacle configuration shown is typically suitable for use in France, it is within the scope of the invention to accommodate voltages and receptacle configurations for world-wide usage.

Figure 1H:
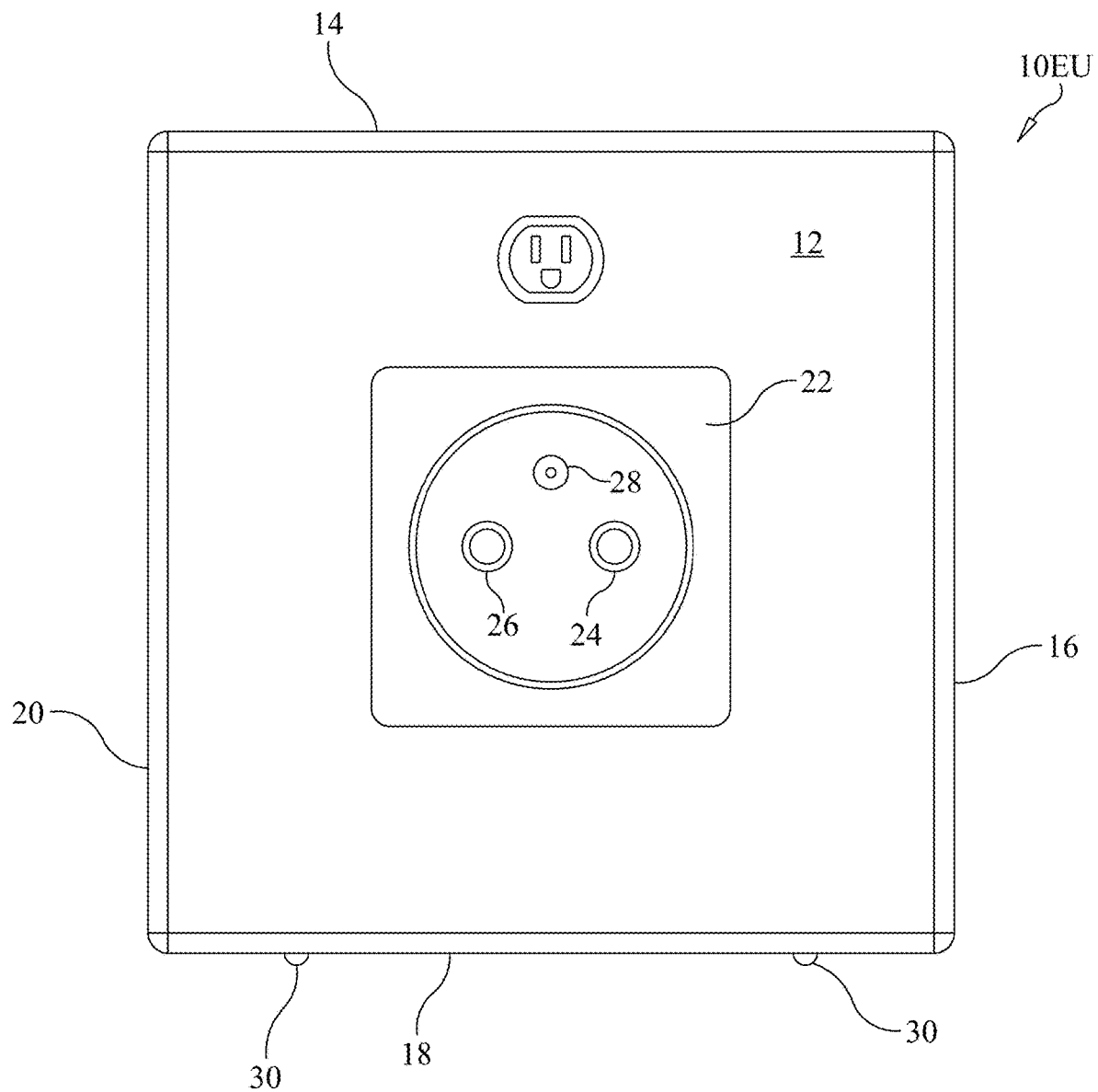
FIG. 1H is a view of a wireless charger for use with a wall-mounted charging device and modular outlet extender in accordance with the present invention.

FIG. 1H shows a European Union style wall-mounted charging device and modular outlet extender of the present invention in which the charging device 10EU includes a front face 12, a top wall 14, a right-side wall 16, a bottom wall 18, and a left side wall 20. The front face includes an outlet plate 22 that includes an outlet, each with a 230V AC "hot" receptacle 24, a neutral receptacle 26, and ground receptacle 28. In the top wall, a receptacle (not shown) is formed for receiving any of a number of charging tips suitable for use with various electronic components. The bottom face 18 includes electrical connectors 30 and optionally universal type connectors (not shown). While the 230V AC and receptacle configuration shown is typically suitable for use in many parts of the EU, it is within the scope of this invention to accommodate voltages and receptacle configurations for world-wide usage.

Figure 2A:
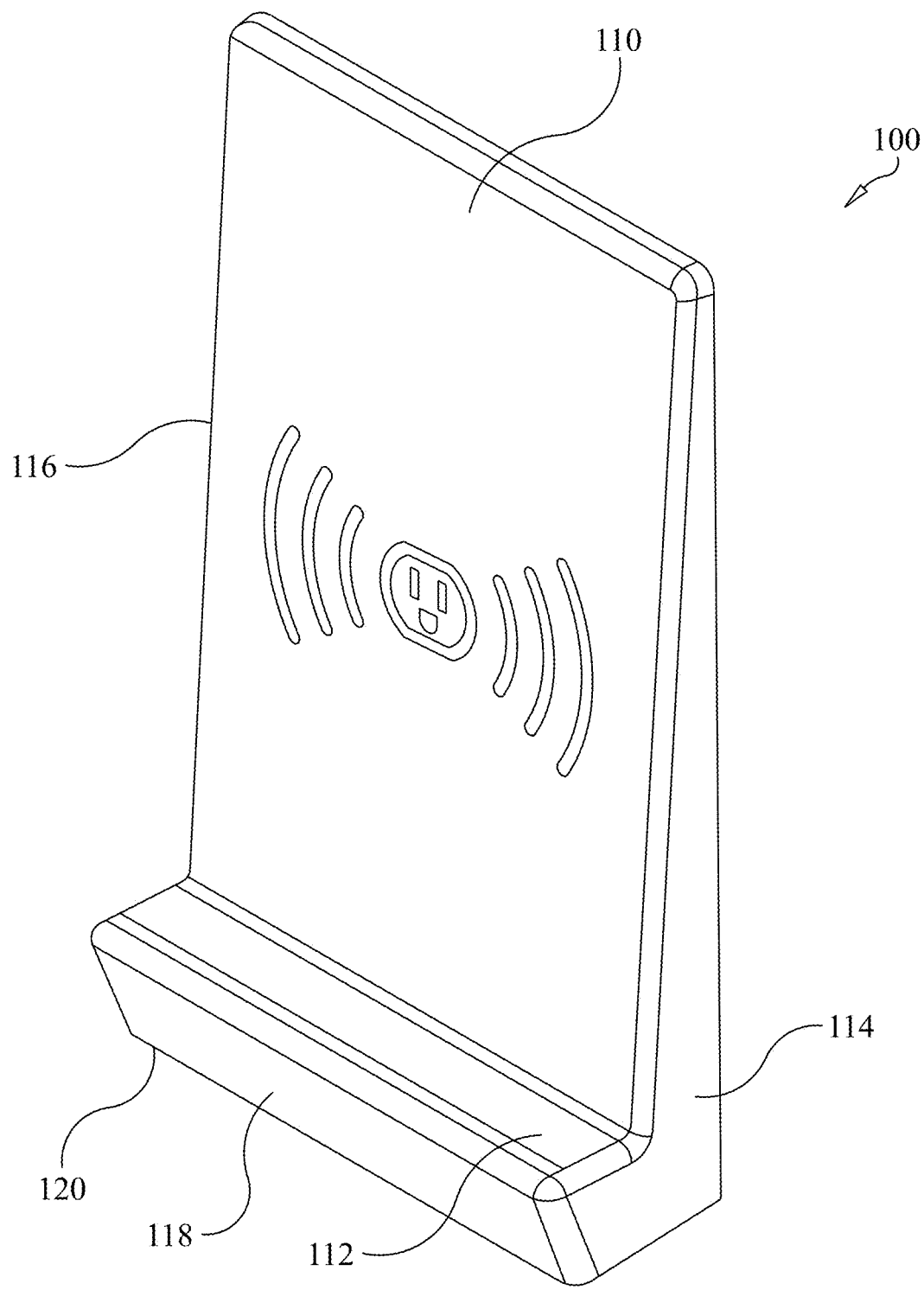
FIG. 2A is a perspective view of a wireless charger for use with a charging system in accordance with the present invention.

FIG. 2A shows a wireless electronic device charger 100 comprising a front face 110, a right wall 114, a left wall 116, a shelf 112 on a cradle 118, and a low surface 120 including power inputs 130 (not shown). The wireless charger 100 includes a radio frequency output for charging an electrical device mounted on cradle 118 wirelessly. The wireless charger 100 rests on the top surface 14 of the charge base 10 and provides a shelf 112 for receiving an electronic device such that a wireless RF connection is made in order to charge the electronic device.

Figure 2B:
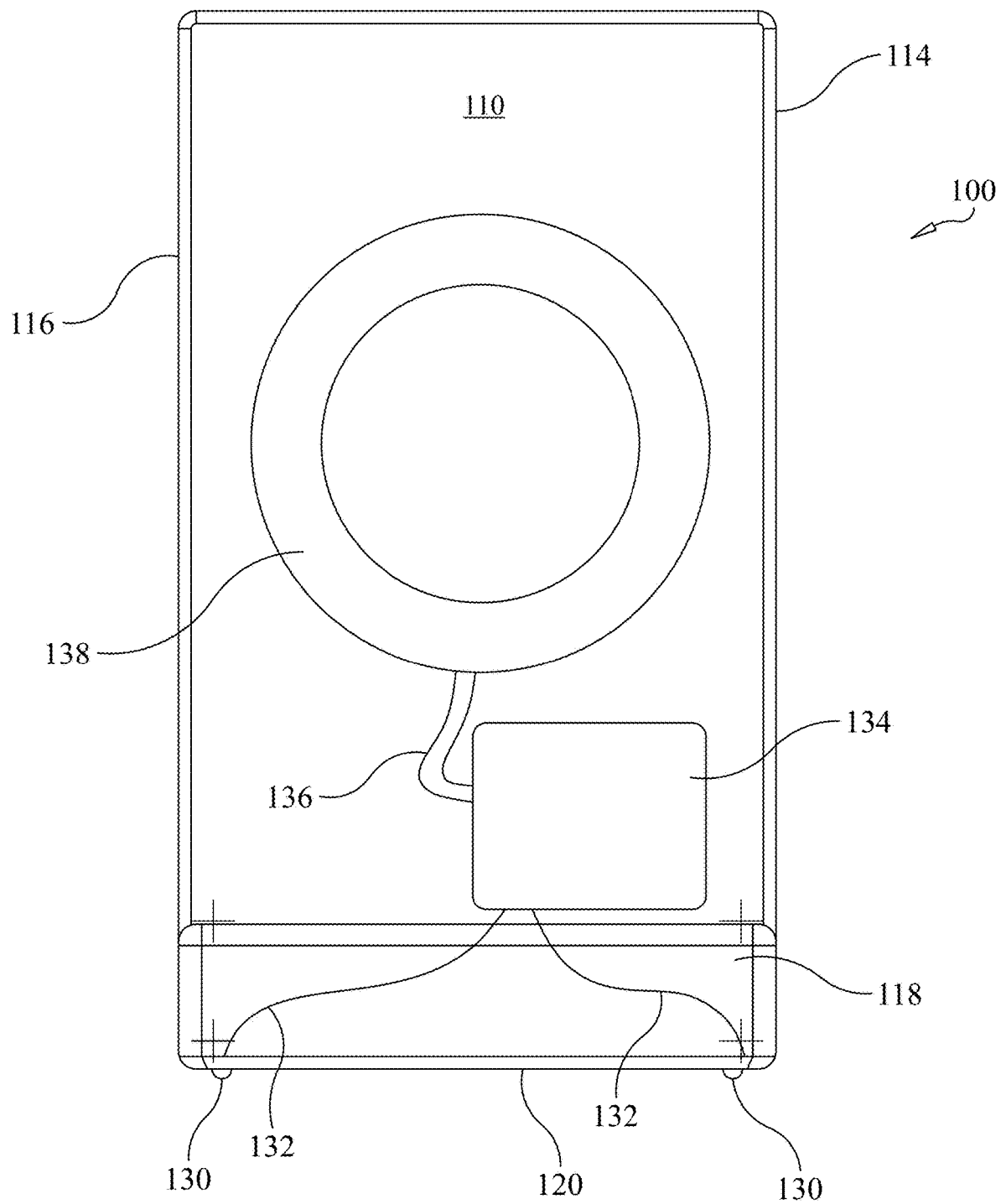
FIG. 2B is a schematic view of a wireless charger for use with a charging system in accordance with the present invention showing internal electronics.

FIG. 2B shows the circuitry within the wireless charger that converts the low-voltage input from the base unit to an RF signal. The wireless electronic device charger 100, comprises a front face 110, a right wall 114, a left wall 116, a shelf 112 on a cradle 118, and a low surface 120 including power inputs 130. The wireless charger 100 includes a radio frequency output 138 for charging an electrical device mounted on the cradle 118 wirelessly. The wireless charger may be connected to another component of the system of the present invention such as a battery block charging device 200, the wall charger 10, the car charger 300, or the wearable charger 400 by electrical connections 130 formed in the base wall 120. Leads 132 link electrical connections 130 to a power adapter 134 to power the wireless coils. One suitable wireless system is known as the Qi standard for low power inductive transfers to deliver power below 5 W using inductive coupling between two planar coils. Leads connect power adaptor to electrodes on a surface of the battery. The wireless charging transmitter is typically powered by an input DC rail of 5V to 19V, from a USB port or an AC/DC power adapter. The transmitter has a coil to transfer power by electromagnetic induction. Some transmitters support multi-coil arrays, driven by separate bridges which are automatically selected to deliver the highest coupled power into the wireless power receiver. The induced power is coupled to the wireless power receiver, which has a similar coil to collect the incoming power. The receiver rectifies the power by means of diode rectifiers, usually made of FETs for improving efficiency. It also filters the power using ceramic output capacitors, and then applies it to the battery that needs to be charged, either through a linear stage or a switching regulator. The battery inside the portable device receives the power and charges up. The receiver can command the transmitter to adjust the charging current or voltage, and to stop transmitting power completely when end of charge is indicated. The electrodes are linked to a circuit board that converts the low-voltage current input to an RF output. The RF signal charges the electronic device. The power controller 134 may also include power management features to monitor the battery during the charging process to cut off the RF signal when the battery is at full charge.

Figure 2C:
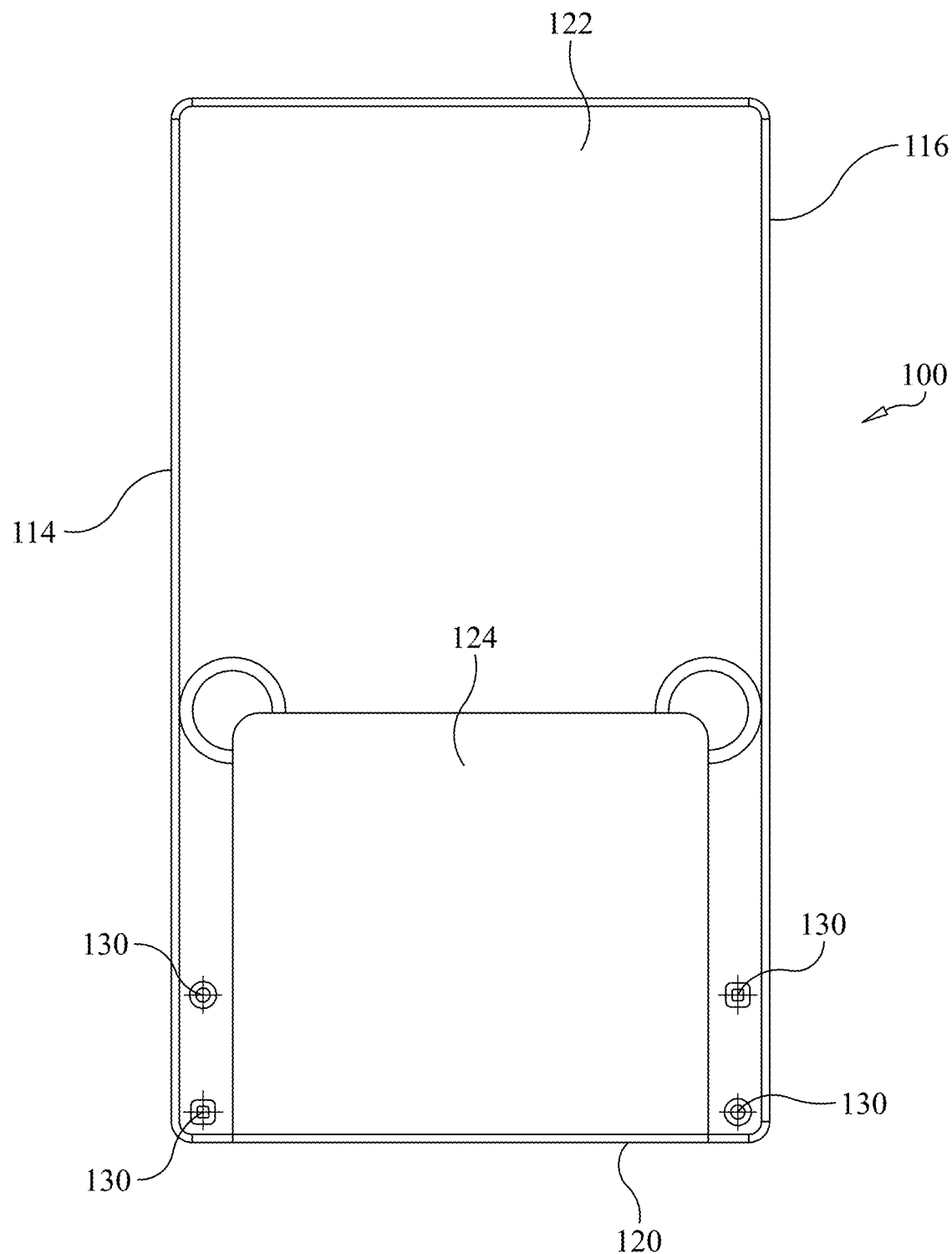
FIG. 2C is a rear view of a wireless charger for use with a charging system in accordance with the present invention.

FIG. 2C shows the rear face 122 of the wireless charger 100. The wireless electronic device charger 100 comprises a front face 110 (not shown), a right wall 114, a left wall 116, a shelf 112 (not shown) on a cradle 118 (not shown), and a low surface 120 including power inputs 130. A hinged support 124 may be included to allow the charger 100 to stand independently. The wireless charger 100 may be connected to another component of the system of the present invention such as a battery block charging device 200.

Figure 2D:
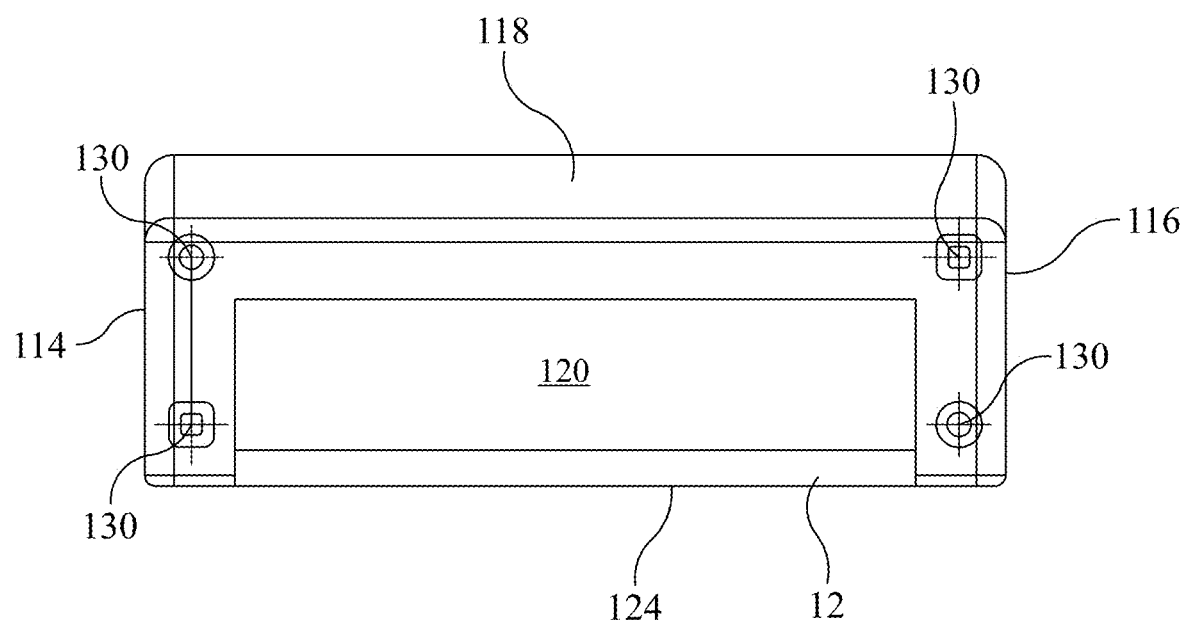
FIG. 2D is a bottom view of a wireless charger for use with a charging system in accordance with the present invention.

FIG. 2D shows the bottom wall 122 of wireless charger 100. The wireless electronic device charger 100 comprises a front face 110 (not shown), a right wall 114, a left wall 116, a shelf 112 on a cradle 118 (not shown), and a low surface 120 including power inputs 130. A hinged support 124 may be included to allow the charger 100 to stand independently. The wireless charger 100 may be connected to another component of the system of the present invention such as a battery block charging device 200

Figure 2E:
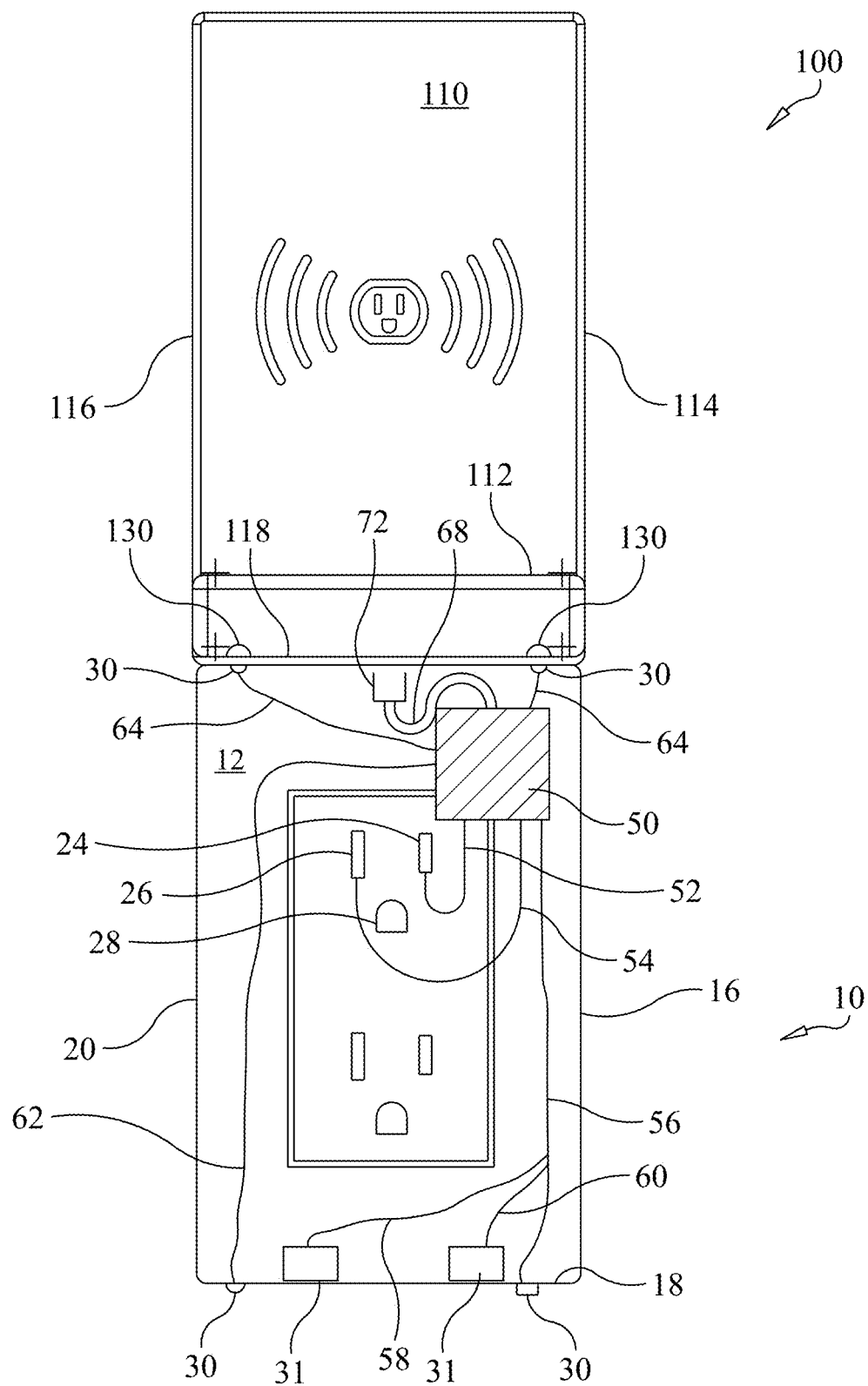
FIG. 2E is a front view and partial schematic of a wireless charger in use with a wall mounted charging device in accordance with the present invention.

FIG. 2E shows a wireless electronic device charger 100 mounted on a wall charger 10 in accordance with the present invention. The wireless charger 100 comprises a front face 110, a right wall 114, a left wall 116, a shelf 112 on a cradle 118, and a low surface 120 including power inputs 130. The wireless charger 100 is shown on the top surface 14 of the charge base 10 and provides a shelf 112 for receiving an electronic device such that a wireless RF connection is made in order to charge the electronic device. The charging device 10 comprises a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and ground receptacle 28. In the top wall 14, a receptacle (not shown) is formed for receiving any of a number of charging tips suitable for use with various electronic components. It is also possible to omit the power manager 134 in the wireless charger 100 by selection of a power adapter 50 in the wall charger 10 that is suitable for use with the wireless antenna under the Qi standard or any other wireless system.

Figure 2F:
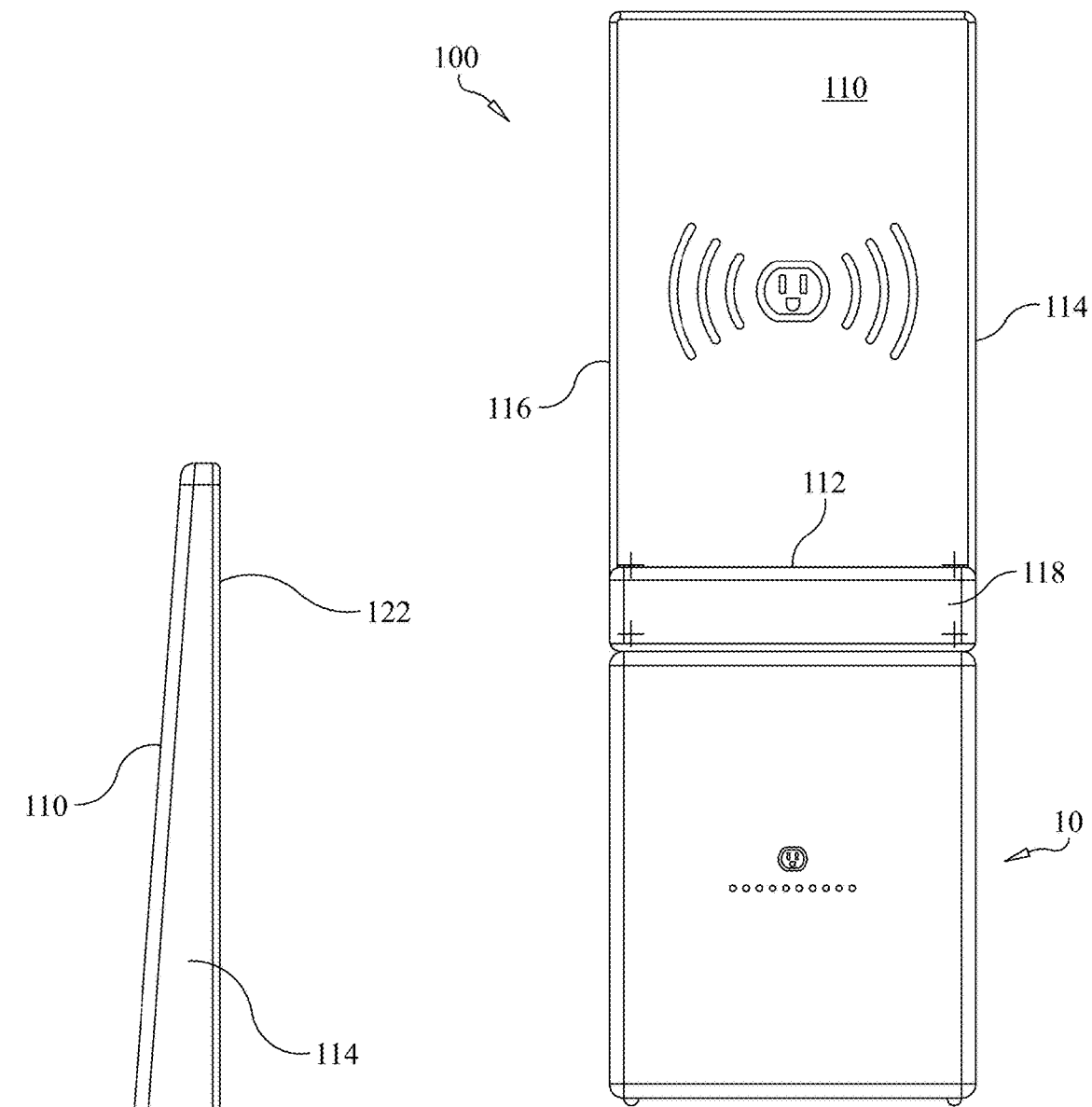
FIG. 2F is a front view of a wireless charger on a battery block charging device in accordance with the present invention.

FIG. 2F shows a wireless electronic device charger 100 mounted on a battery block 200 in accordance with the present invention. The wireless charger 100 comprises a front face 110, a right wall 114, a left wall 116, a shelf 112 on a cradle 118, and a lower surface 120 (not shown) including power inputs 130. The wireless charger 100 is shown linked to the top surface of the battery block 200 as disclosed hereinbelow. The wireless charger 100 provides a shelf 112 for receiving an electronic device such that a wireless RF connection is made in order to charge the electronic device.

Figure 2G:
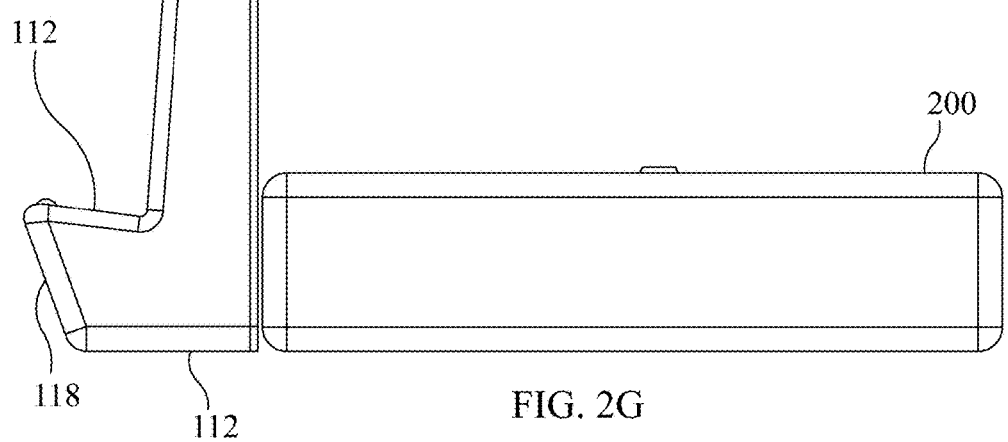
FIG. 2G is a side view of a wireless charger in a self-supporting use with a battery block charging device in accordance with the present invention.

FIG. 2G shows a wireless electronic device charger 100 mounted on a battery block 200 in accordance with the present invention. The wireless charger 100 comprises a front face 110, a right wall 114, a left wall 116 (not shown), a shelf 112 on a cradle 118, a lower surface 120, and a rear wall 122 including power inputs 130 (as shown in FIG. 2C). The wireless charger 100 is shown linked to the top surface of the battery block 200 as disclosed hereinbelow. Linking the rear face 122 of the wireless charger 100 to the battery block 200 provides a charger 100 that is freestanding.

Figure 2H:
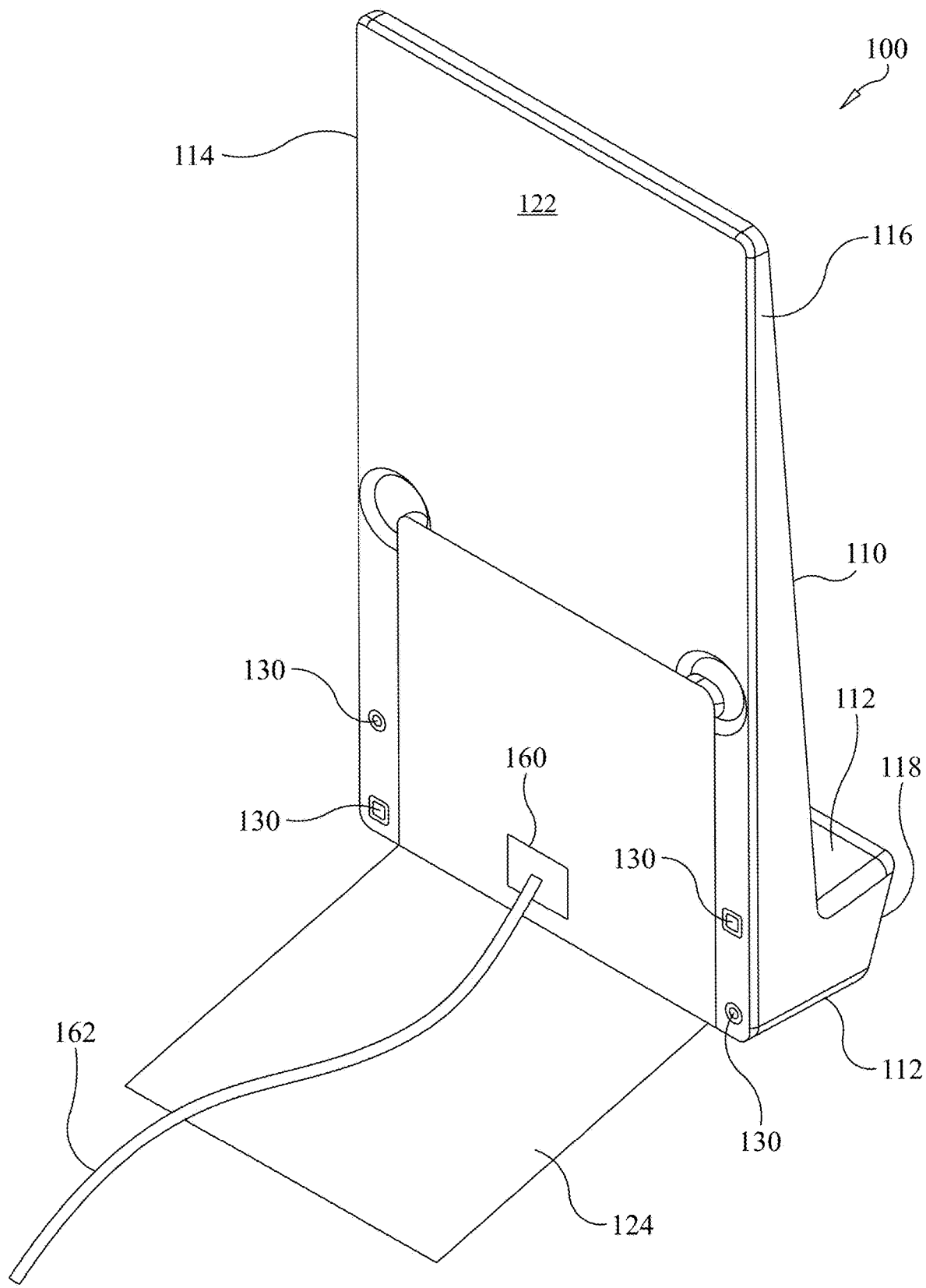
FIG. 2H is a rear perspective view of a wireless charger with a rear support deployed and a charge cable attached to a wireless charger in accordance with the present invention.

FIG. 2H shows a wireless electronic device charger 100 connected to a power supply 162 such as a USB cable. The wireless charger 100 comprises a front face 110, a right wall 114, a left wall 116 (not shown), a shelf 112 on a cradle 118, a lower surface 120, and a rear wall 122, including power inputs 130. Lowering the support 124 from the rear face 122 of the wireless charger 100 exposes a connection, such as a USB port, and provides a wireless charger 100 that is freestanding and having a constant power source via the cable 162.

Figure 3A:
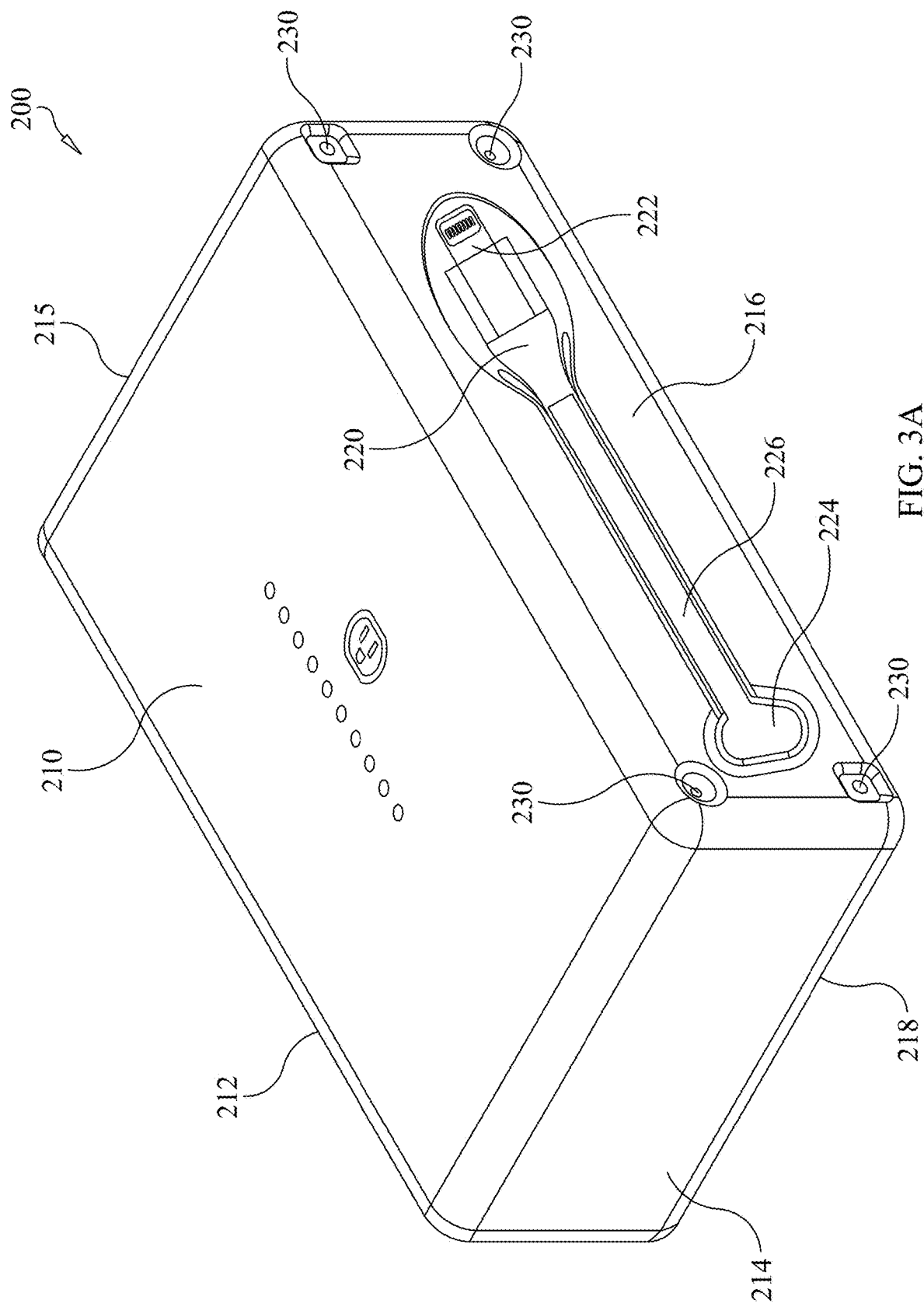
FIG. 3A is a lower perspective view of an accessory battery pack suitable for use with a modular charging system in accordance with the present invention.

FIG. 3A shows a stackable battery block power component 200 that may be attached to a wall-mounted charger and other associated components. The battery block 200 is suitable for charging electronic components such as phones, tablets, readers, and other low-voltage devices via a flexible cable 220. The battery block 200 comprises a housing having a front wall 210, a top wall 212, a left wall 214, a right wall 215, a rear wall 218, and a bottom wall 216. At least one connector cable 220 may be included within the battery block 200. The cable 220 may either be permanently connected to the battery block 200 or connected via a serial port (not shown). The cable 220 is preferably installed in a recess 220 formed in the battery block 200.

Figure 3B:
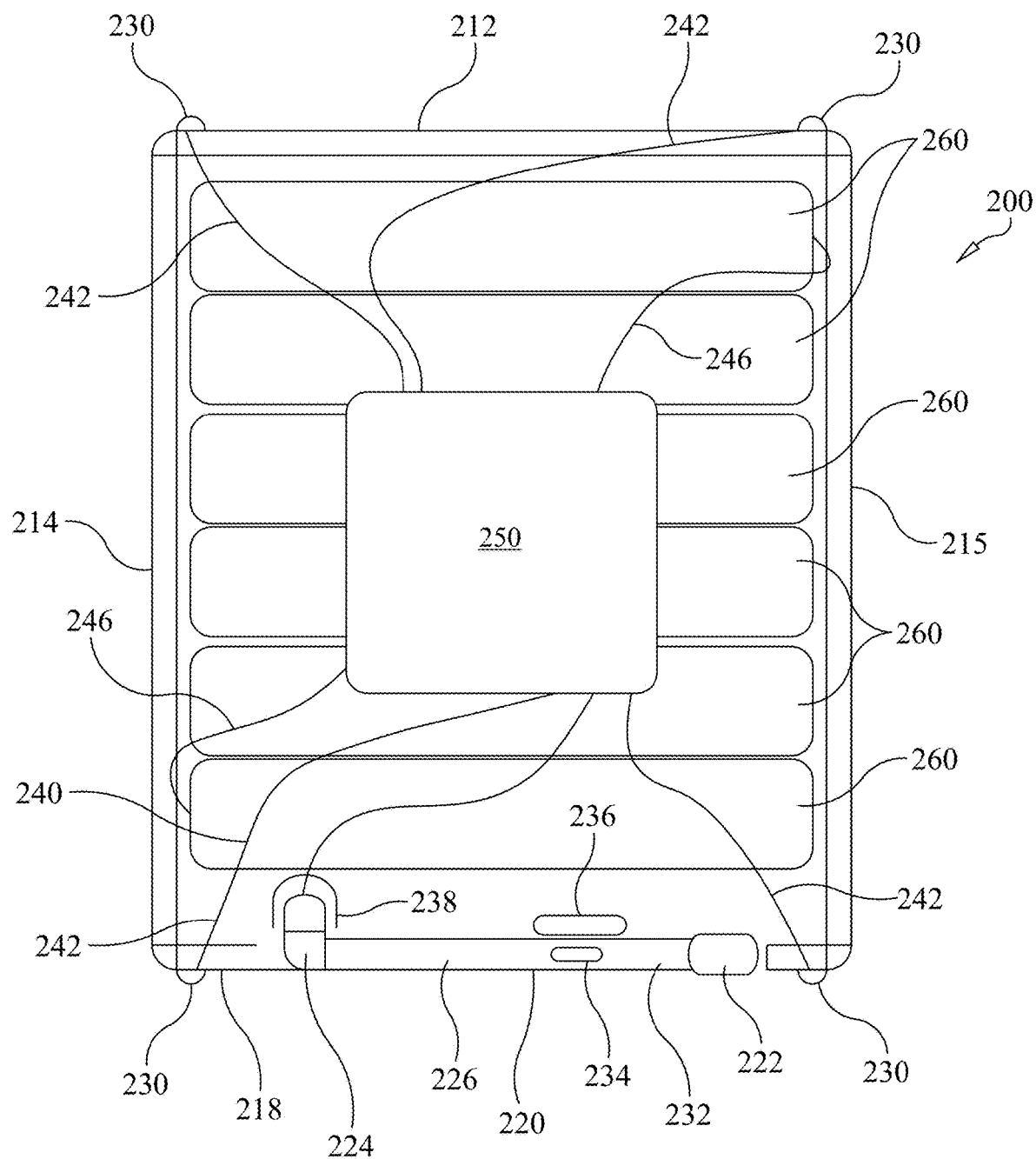
FIG. 3B is a front schematic view of an accessory battery pack showing the internal electronics suitable for use with a modular charging system in accordance with the present invention.

FIG. 3B shows a schematic of a battery block power component 200 useful with the associated components of the present invention. The battery block 200 comprises a front wall 210, a top wall 212, a left wall 214, a right wall 215, a rear wall 218, and a bottom wall 216. At least one connector cable 220 may be included within the battery block 200. A number of linked battery cells 260 are included within battery block 200. Cells 260 may be linked in series or parallel, or in a combination of series and parallel to provide the desired output. Integrated circuit power managers 250 are designed for various cell combinations and may monitor each cell individually and the output of the linked cells. The U.S. Federal Aviation Administration (FAA) limits carryon battery power blocks 200 to a capacity of 27,000 mAh, which is generally considered an upper limit for broad acceptance, however larger battery blocks 200 may be made and sold for use not limited by the FAA regulations. Battery leads 246 link the positive and negative terminals of the power pack and provide power input to the controller 250 and information to monitor the power output and remaining charge in the cells 260. Leads 242 provide power to electrical connectors 230. Another set of leads 240 provide power to the cable 220 via serial port 238. As shown, the cable 220 may include a central shaft 226 having a serial connection 238, such as a USB-C connector on the proximal end and a separate connector 222 at the distal end 232, such as a USB or Apple Lightning® connector. The cable 200 may also include a permanent magnet 234 which is attracted to a permanent magnet 236 mounded within the battery block 200 to releasably retain the distal end 232 within the recess 220. The battery block 200 is suitable for charging electronic components such as phones, tablets, readers, and other low-voltage devices via the flexible cable 220. Separate cables may be used so that block 200 may charge devices having different power inputs.

Figure 3C:
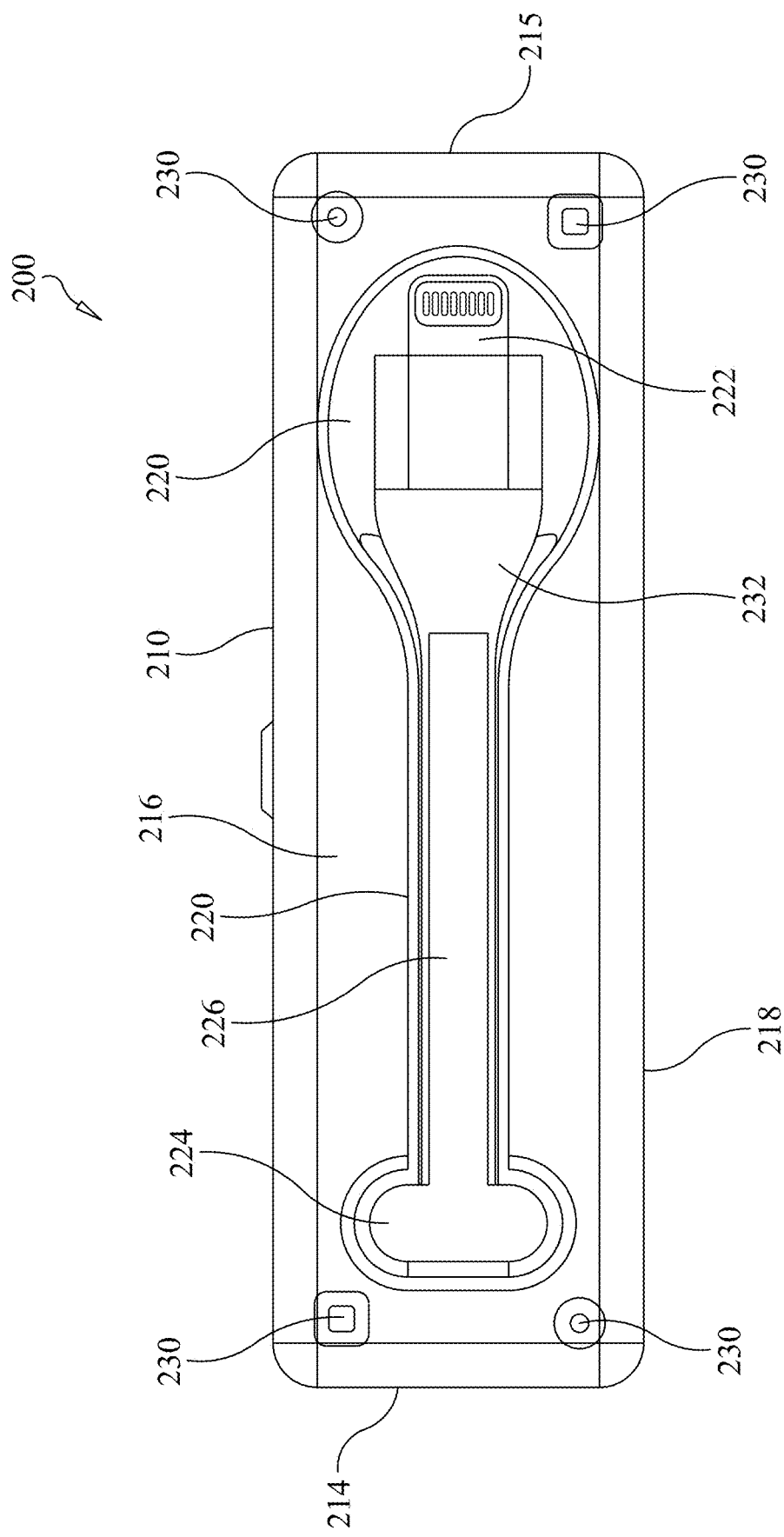
FIG. 3C is a bottom view of an accessory battery pack suitable for use with a modular charging system in accordance with the present invention.

FIG. 3C shows a schematic of a battery block power component 200 useful with the associated components of the present invention. The battery block 200 comprises a front wall 210, a top wall 212, a left wall 214, a right wall 215, a rear wall 218, and a bottom wall 216. At least one connector cable 220 may be included within the battery block 200. Electrical connectors 230 may be used to link the block 200 to other components in the modular charging system. As shown, the cable 220 may include a central shaft 226 having a serial connection 238, such as a USB-C connector on the proximal end and a separate connector 222 at the distal end 232, such as a USB or Apple Lightning® connector. The cable 220 may also include a permanent magnet 234 which is attracted to a permanent magnet 236 mounded within the battery block 200 to releasably retain the distal end 232 within the recess 220. The battery block 200 is suitable for charging electronic components such as phones, tablets, readers, and other low-voltage devices via the flexible cable 220. Separate cables may be used so that the block 200 may charge devices having different power inputs.

Figure 3D:
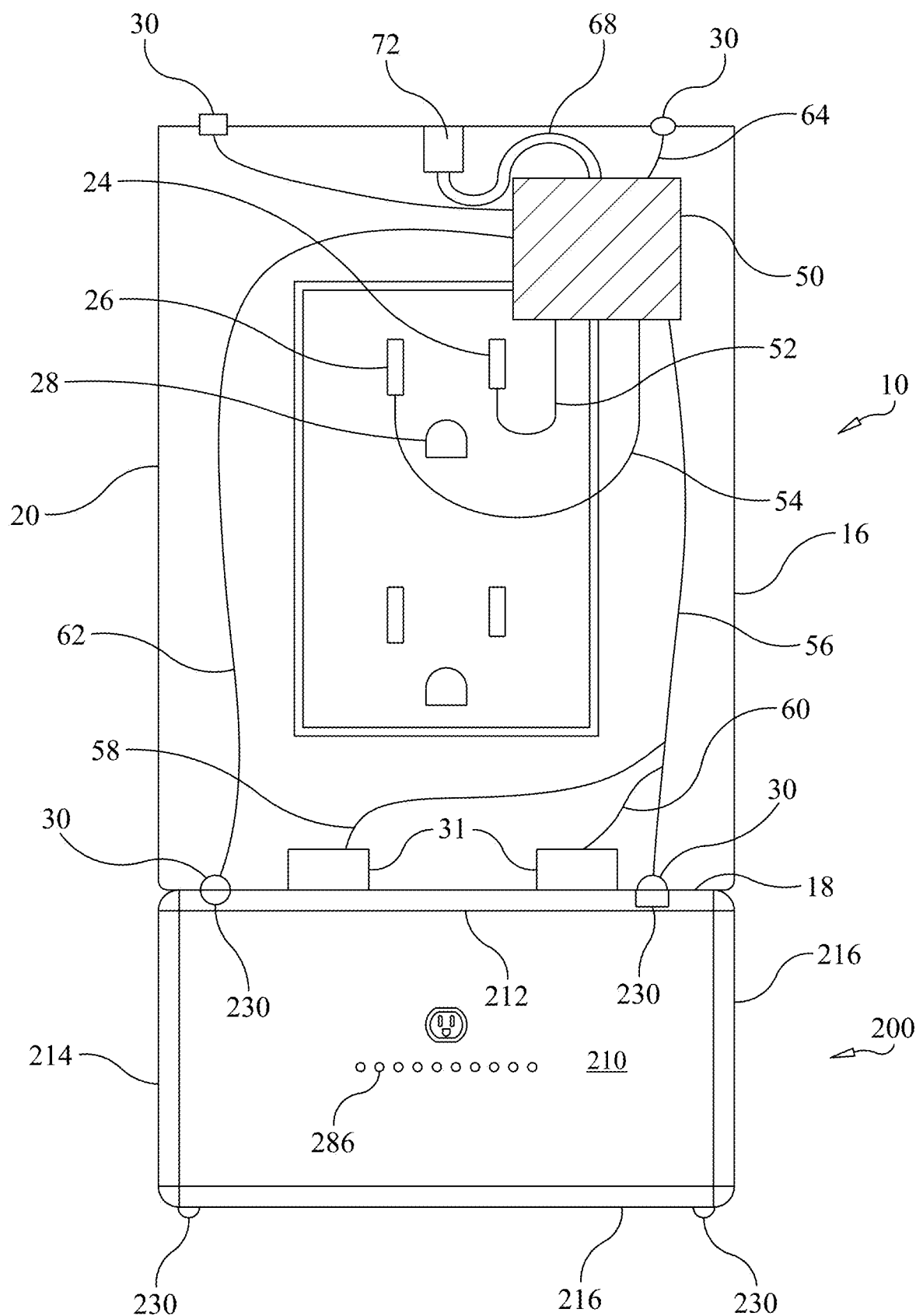
FIG. 3D is a bottom view and partial schematic of an accessory battery pack suitable for use with a modular charging system in accordance with the present invention.

FIG. 3D shows a battery block 200 mounted on a wall charger 10 in accordance with the present invention. The battery block 200 comprises a front face 210, a right wall 216, a left wall 214, a top wall 212, and a bottom surface 216, including power inputs 230. The battery block 200 is shown on a bottom wall 18 of a charge base 10. The charging device 10 comprises a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and a ground receptacle 28. The connections may be magnetized for secure connection to a charging base or the housing may include magnets for providing the connection. In the event that the connector pins are magnetic, it may be useful to have an electronically conducting coating on the pins rather than relying on the magnetic material as the conductor. A charge indicator, such as LEDs or LCDs may be included in the housing to indicate that a connection is made with a charging base or the status of the charge in the stackable power device. The housing of the battery block 200 includes corresponding magnets so the power device may be removably but securely connected to the charging device. Leads 52, 54 connect a power adaptor 50 to receptacles 24, 26 and blades 34, 36. The power adapter 50 is also connected to leads 54, 56, 58, 60 and 62 to power the connections 30, 31 on the bottom wall 18. Leads 64, 66 power connections 30 on the top wall 14 and lead 68 powers connection port 72, into which a tip 70 may be inserted. Any other low-voltage connections formed in the front face, top wall, sidewalls, or bottom wall may be connected to the power adapter 50. Power connections 230 in the battery block 200 connect to power connections 30 in the wall charger 10 to charge the cells within the battery block 200. The battery block 200 may include a permanent magnet in the housing 200 or each connection 230 may be magnetized to provide a sturdy, but easily removable connection.

Figure 3E:
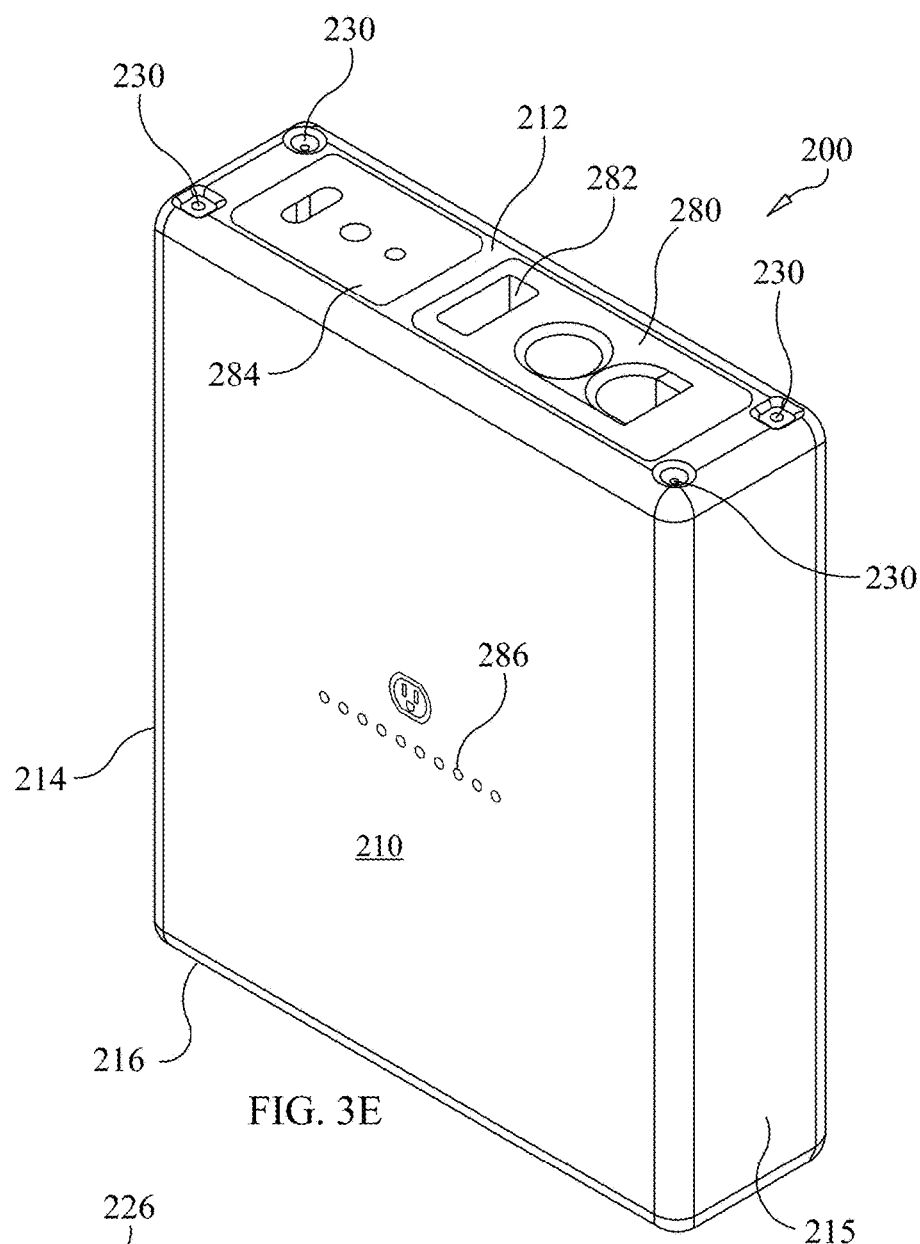
FIG. 3E is a lower perspective view of an accessory battery pack suitable for use with a modular charging system in accordance with the present invention.

FIG. 3E shows a stackable battery block power component 200 that may be attached to a wall mounted charger and other associated components. The battery block 200 is suitable for charging electronic components such as phones, tablets, readers, and other low-voltage devices. The battery block 200 includes a housing comprising a front wall 210, a top wall 212, a left wall 214, a right wall 215, a rear wall 218, and a bottom wall 216. Any number of outputs may be included in the top wall 212, including a 12V output 280, suitable for connection to jumper cables to start a motor vehicle, a USB-A 282 and USB-C 284 connections are also shown. LEDs or LCDs power monitor lights 286.

Figure 3F:
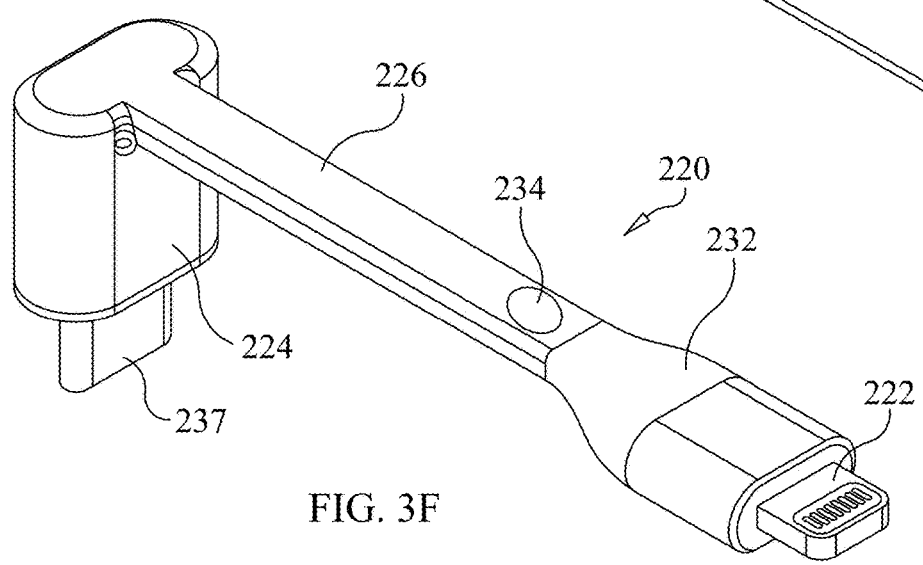
FIG. 3F is an upper perspective view of a connection cable suitable for use with accessories in accordance with the present invention.

FIG. 3F shows one form of a cable 220 that may include a central shaft 226 having a proximal end 224 having a serial connection 237 such as a USB-C connector. The proximal end 224 is placed in a power component 200 such that the serial connection 237 is mated to a bus 238. A connector 222 such as a USB or Apple Lightning® connector is positioned at the distal end 232 of the cable 200. The cable 200 may also include a permanent magnet 234 which is attracted to permanent magnet 236 mounded within battery block 200 to releasably retain the distal end 232 within recess 220 of any of devices shown.

Figure 4A:
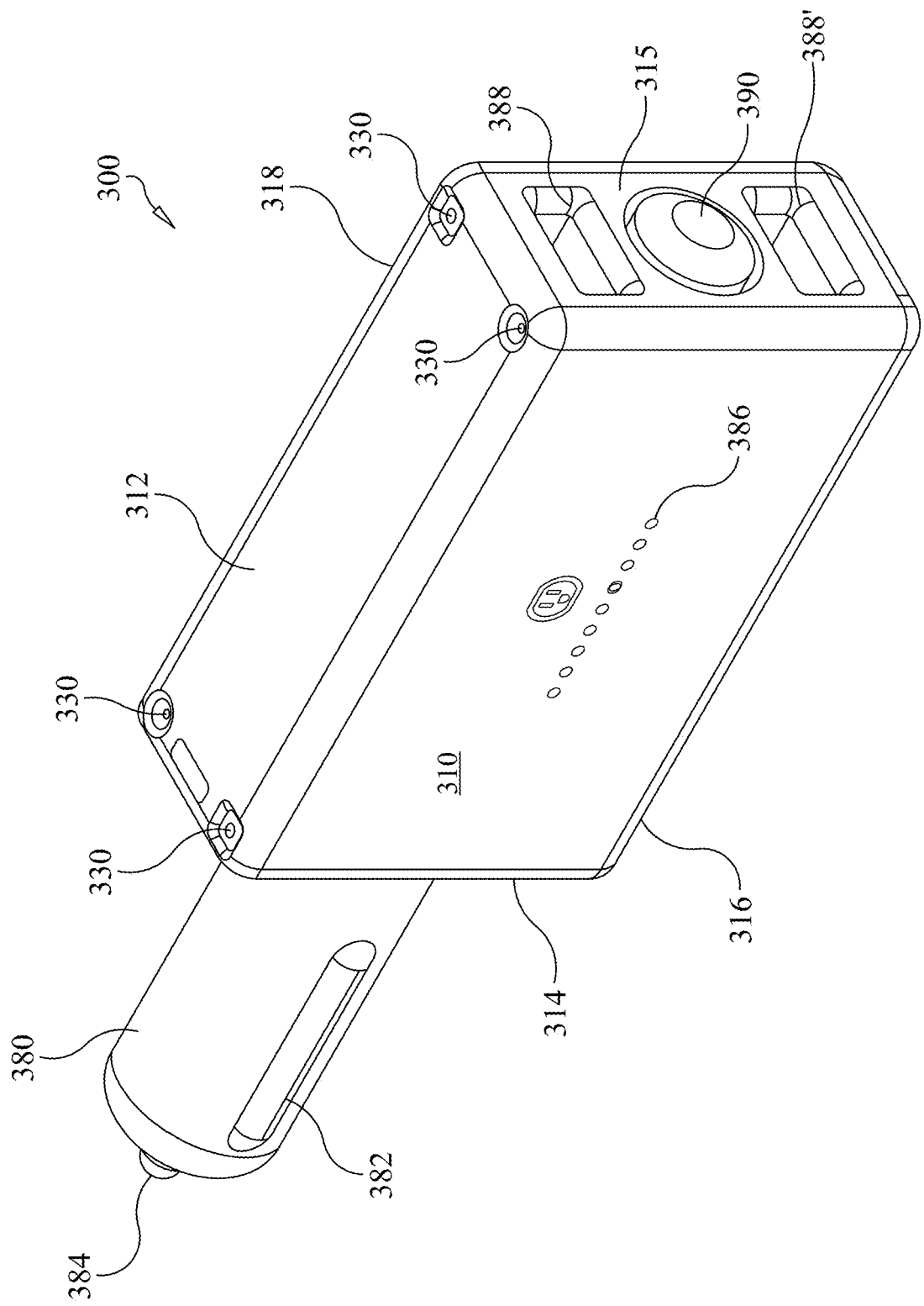
FIG. 4A is a perspective view of an accessory car charger suitable for use with a modular charging system in accordance with the present invention.

FIG. 4A shows a portable car charger power component 300 for use in a vehicle 12V charger. The car charger 300 is suitable for charging electronic components such as phones, tablets, readers, and other low-voltage devices. The car charger power component 300 includes a battery storage so a device such as a cell phone may be charged when the vehicle is immobile on the side of the road with a failed electrical system. The car charger 300 includes a housing comprising a front wall 310, a top wall 312, a left wall 314, a right wall 315, a rear wall 318, and a bottom wall 316. A barrel 380 extends from the left wall 314 for insertion into a vehicle 12V charge port. Contacts 382, 384 extend from the barrel 380 to make an electrical connection with the vehicle 12V port. Charge monitor indicators 386 such as LEDs or LCDs. Power outputs 388, such as USB-A or USB-C, and an LED flashlight may be included on the left wall 315.

Figure 4B:
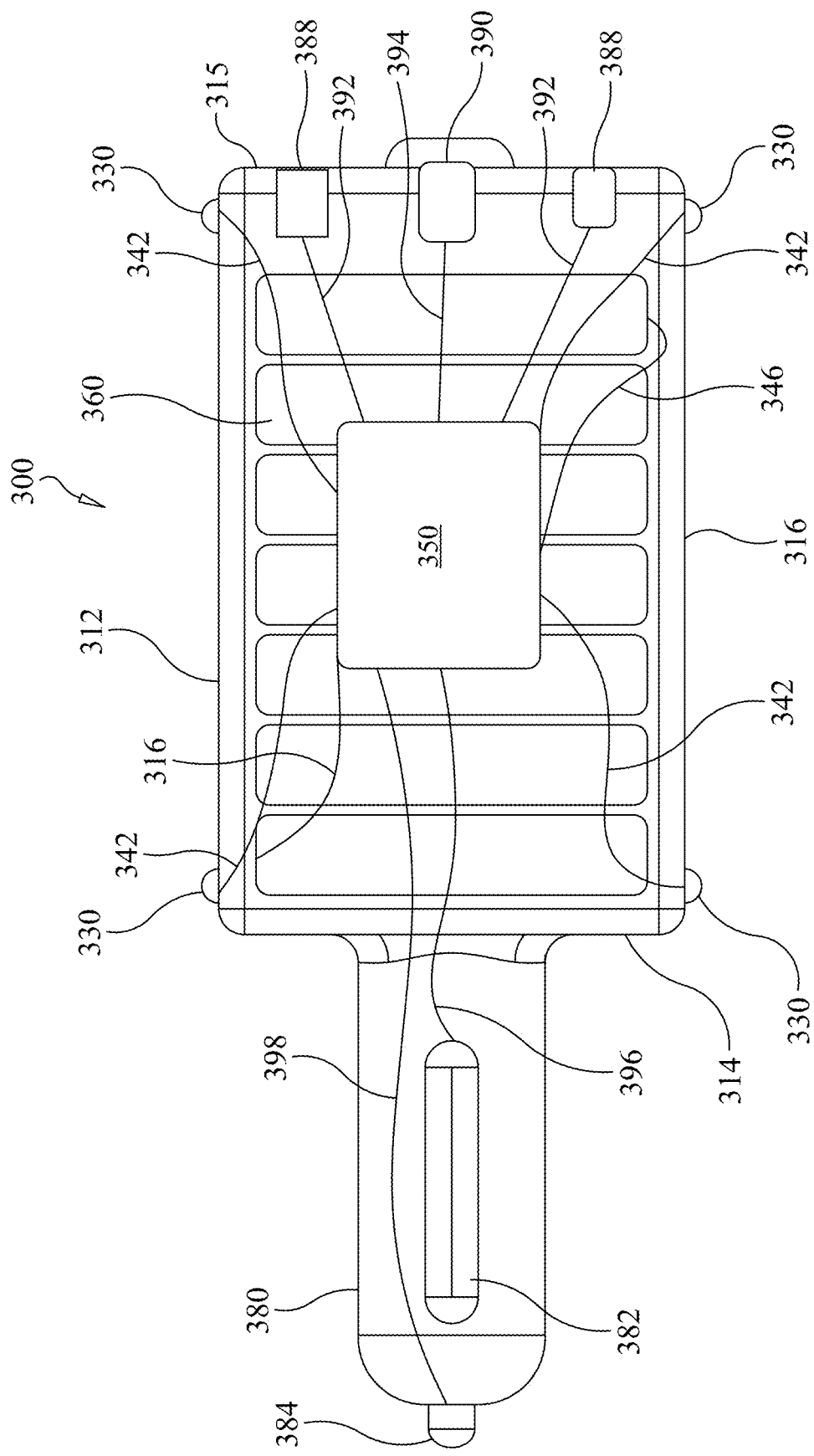
FIG. 4B is a side schematic view of an accessory car charger suitable for use with a modular charging system in accordance with the present invention.

FIG. 4B shows a schematic of a car charger power component 300 useful with the associated components of the present invention. The car charger power component 300 includes a top wall 312, a left wall 314, a right wall 315, a rear wall 318 (not shown), and a bottom wall 316. A number of linked battery cells 360 are included within the car charger power component 300. The cells 360 may be linked in series or parallel, or in a combination of series and parallel to provide the desired output. Integrated circuit power managers 350 are designed for various cell combinations and may monitor each cell individually and the output of the linked cells. Battery leads 346 link the positive and negative terminals of the power pack and provide power input to the controller 350 and information to monitor the power output and remaining charge in cells 360. Leads 342 provide power to electrical connectors 330. Leads 392 provide power to bus connections 392 and a lead 394 connects the power manager 350 to an LED flashlight 390. The barrel contacts 382, 384 are linked to the power controller 350 via leads 396, 398 to make the electrical connection with the vehicle 12V port.

FIG. 4C shows a schematic of a car charger power component 300 useful with the associated components of the present invention. The car charger power component 300 comprises a front wall 310, a top wall 312 (not shown), a left wall 314, a right wall 315, a rear wall 318, and a bottom wall 316. At least one connector cable 320 may be included within the car charger power component 300. Electrical connectors 330 may be used to link the car charger power component 300 to other components in the modular charging system of the present invention. As shown, a cable 320 may include a central shaft 326 having a serial connection 338, such as a USB-C connector, on the proximal end and a separate connector 322 at the distal end 332, such as a USB or Apple Lightning® connector. The cable 320 may also include a permanent magnet 234 which is attracted to a permanent magnet 236 (as shown in FIG. 3B) mounded within the car charger power component 300 to releasably retain the distal end 332 within recess 320. The car charger power component 300 is suitable for charging electronic components such as phones, tablets, readers, and other low-voltage devices via the flexible cable 320. Separate cables may be used so that the car charger power component 300 may charge devices having different power inputs.

FIG. 4D shows a schematic of a car charger power component 300 useful with the associated components of the present invention. The car charger power component 300 comprises a front wall 310, a top wall 312, a left wall 314, a right wall 315, a rear wall 318, and a bottom wall 316. Electrical connectors 330 may be used to link the car charger power component 300 to other components in the modular charging system of the present invention. An LED flashlight 390 may be included on the right wall 315 for emergency light. A barrel 380 extends from the left wall 314 for insertion into a vehicle 12V charge port. Contacts 382, 384 extend from the barrel 380 to make an electrical connection with the vehicle 12V port.

Figure 4E:
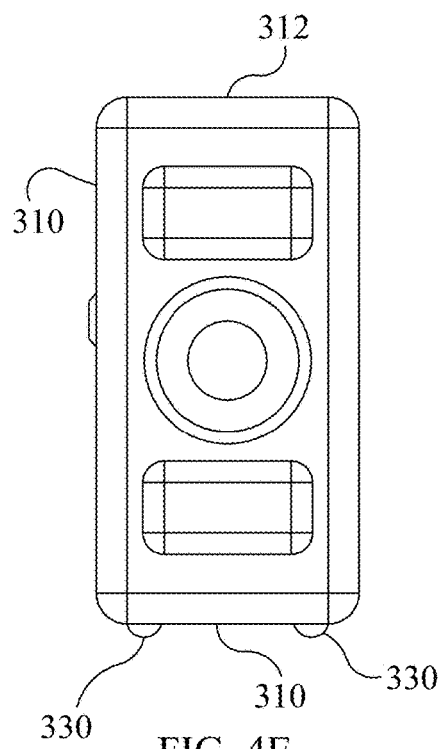
FIG. 4E is a side view of an accessory car charger suitable for use with a modular charging system in accordance with the present invention.

FIG. 4E shows a schematic of a car charger power component 300 useful with the associated components of the present invention. The car charger, power component 300 includes a front wall 310, a top wall 312, a left wall 314 (not shown), a right wall 315, a rear wall 318, and a bottom wall 316. Electrical connectors 330 may be used to link the car charger power component 300 to other components in the modular charging system of the present invention. Bus connections 388, such as USB-A or USB-C and LED flashlight 390 and may be included on the right wall 315. A barrel 380 extends from left wall 314 for insertion into a vehicle 12V charge port. Contacts 382, 384 extend from barrel 380 to make an electrical connection with the vehicle 12V port.

Figure 4F:
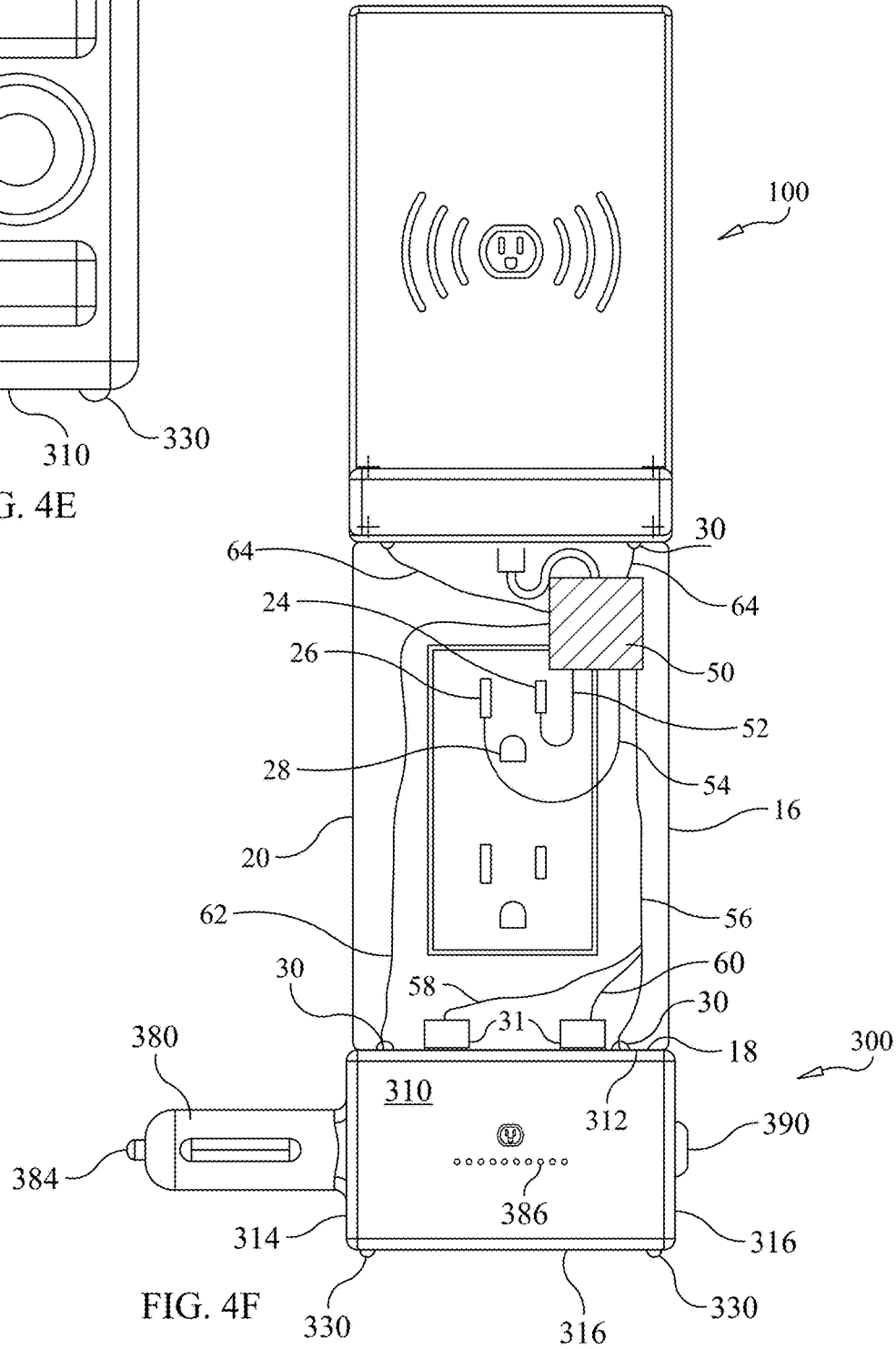
FIG. 4F is a front view and partial schematic of an accessory car charger mounted to an underside of an outlet wall-mounted charging device, with a wireless charge unit mounted to the top side in accordance with the present invention.

FIG. 4F shows a car charger power component 300 which comprises a front wall 310, a top wall 312, a left wall 314, a right wall 315, a rear wall 318 (not shown), and a bottom wall 316. Electrical connectors 330 on the top wall 312 (obscured) are used to link the car charger power component 300 to the bottom wall 18 of a wall charger 10. The charging device 10 comprises a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and ground receptacle 28. The connections may be magnetized for secure connection to a charging base or the housing may include magnets for providing the connection. In the event the connector pins are magnetic, it may be useful to have an electronically conducting coating on the pins rather than relying on the magnetic material as the conductor. The housing of the car charger power component 300 includes corresponding magnets so the power device 300 may be removably but securely connected to the charging device. Leads 52, 54 connect a power adaptor 50 to the receptacles 24, 26 and blades 34, 36. The power adapter 50 is also connected to leads 54, 56, 58, 60 and 62 to power the connections 30, 31 on the bottom wall 18. Leads 64, 66 power connections 30 on the top wall 14 and lead 68 powers a connection port 72 into which a tip 70 may be inserted. Any other low-voltage connections formed in the front face, top wall, sidewalls, or bottom wall may be connected to the power adapter 50. Power connections 330 in the car charger power component 300 connect to the power connections 30 in the wall charger 10 to charge the cells within the car charger power component 300. The car charger power component 300 may include a permanent magnet in the car charger power component 300 or each connection 330 may be magnetized to provide a sturdy, but easily removable connection. An LED flashlight 390 may be included on the right wall 315 for emergency light. A barrel 380 extends from left wall 314 for insertion into a vehicle 12V charge port. Contacts 382, 384 extend from the barrel 380 to make an electrical connection with the vehicle 12V port.

Figure 4G:
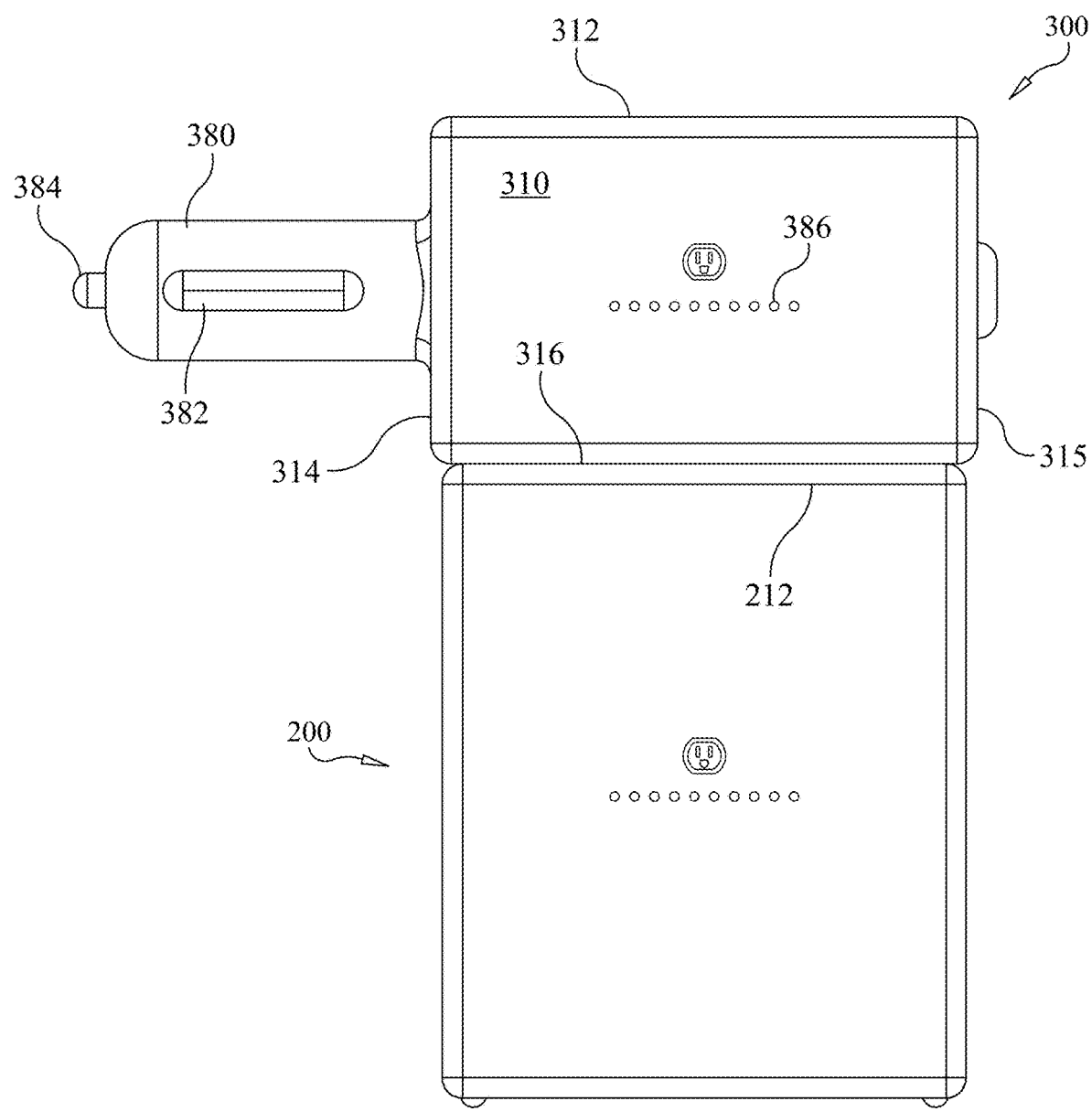
FIG. 4G is a front view of an accessory car charger mounted to an accessory battery unit in accordance with the present invention.

FIG. 4G shows a car charger power component 300 which comprises a front wall 310, a top wall 312, a left wall 314, a right wall 315, a rear wall 318 (not shown), and a bottom wall 316 connected to a battery pack 200. An LED flashlight 390 may be included on right wall 315 for emergency light. A barrel 380 extends from the left wall 314 for insertion into a vehicle 12V charge port. Contacts 382, 384 extend from the barrel 380 to make an electrical connection with the vehicle 12V port. Electrical connectors 330 on the bottom wall 316 (obscured) are used to link the car charger power component 300 to electrical connectors 230 (also obscured) on top wall 212 of a battery block 200.

Figure 5A:
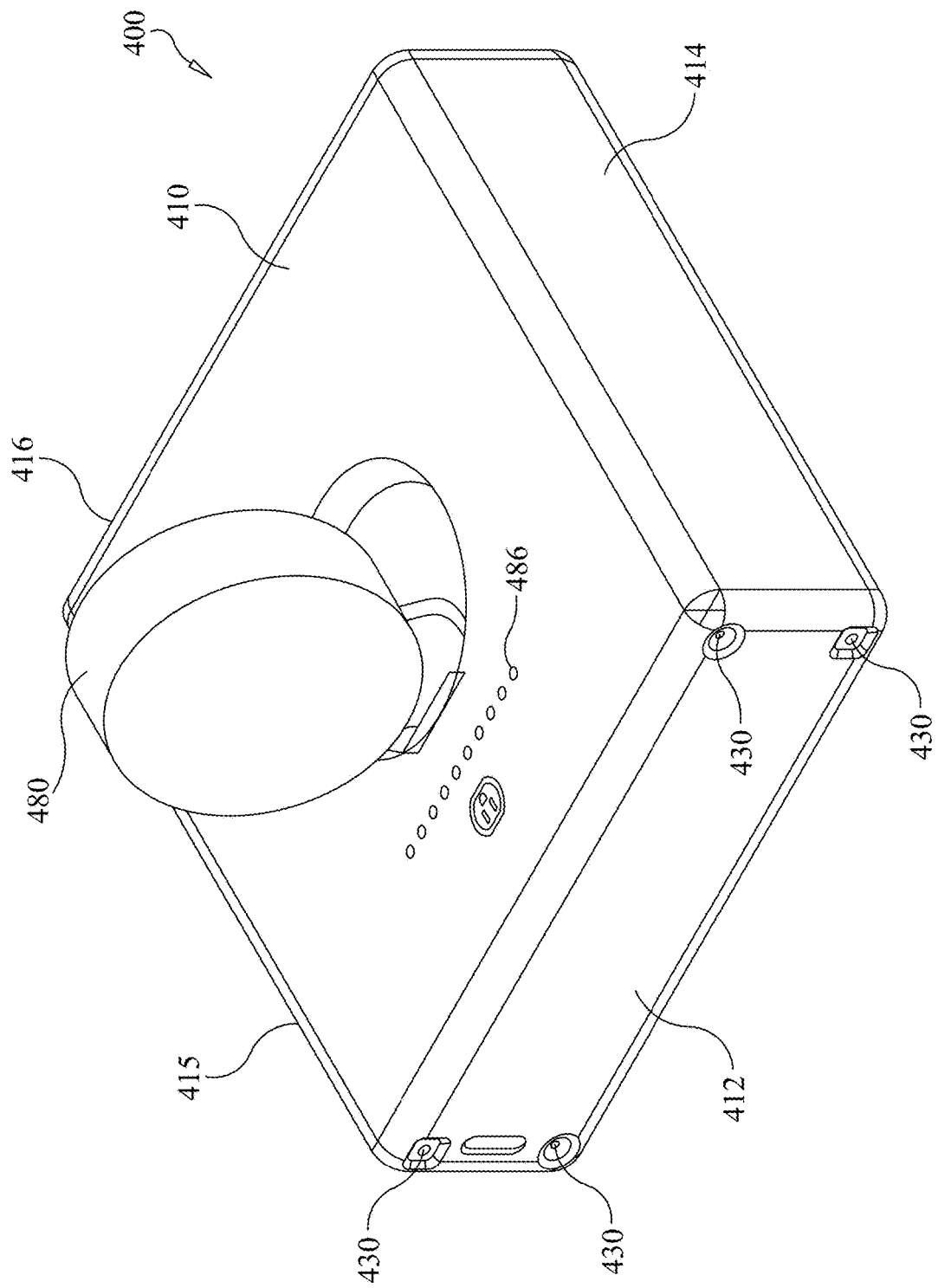
FIG. 5A is an upper perspective view of a portable charger unit for a wearable device in accordance with the present invention.

FIG. 5A shows a wearable device charger 400 suitable for use with the charging system of the present invention. For example, the wearable device charger 400 may be mounted on any of the charge carrying devices of the present system. The wearable device charger 400 includes a battery storage so a device such as a wearable device may be charged without a power cord. The wearable device charger 400 includes a front wall 410, a top wall 412, a left wall 414, a right wall 415, a rear wall 418, and a bottom wall 416. A retractable device support 380 extends from the front wall 410. The wearable device is placed on a retractable support 380 to provide power to the wearable device. Contacts 430 charge monitor indicators 486 such as LEDs or LCDs.

Figure 5B:
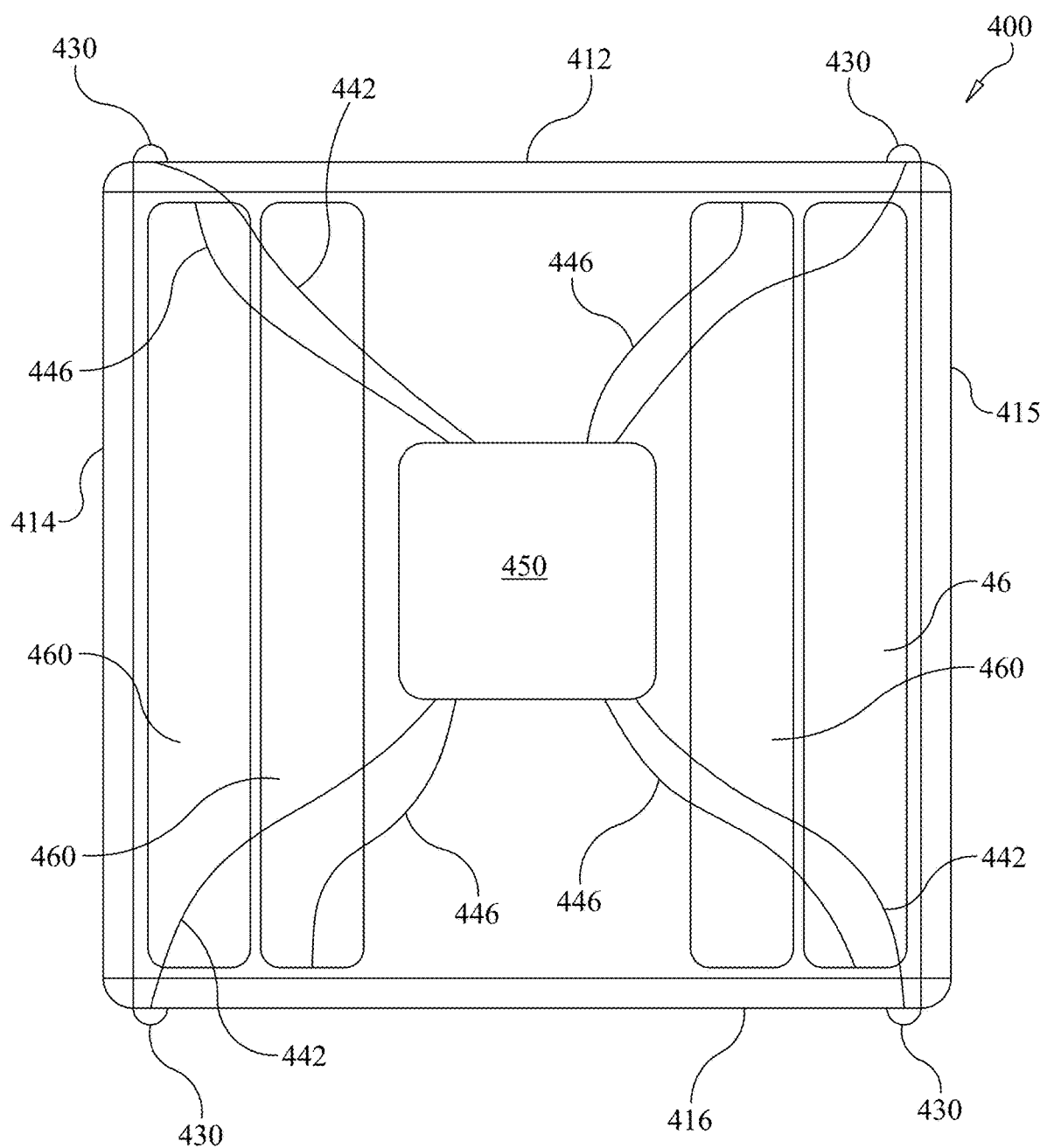
FIG. 5B is a schematic view of a portable charger for a wearable device unit in accordance with the present invention.

FIG. 5B shows a schematic of a wearable device charger 400 useful with the associated components of the present invention. A car charger power component 300 includes a top wall 412, a left wall 414, a right wall 415, a rear wall 418 (not shown), and a bottom wall 416. A number of linked battery cells 460 are included within the wearable device charger 400. Cells 460 may be linked in series or parallel, or in a combination of series and parallel to provide the desired output. Integrated circuit power managers 450 are designed for various cell combinations and may monitor each cell individually and the output of the linked cells. Battery leads 446 link the positive and negative terminals of the power pack and provide power input to controller 450 and information to monitor the power output and remaining charge in cells 460. Leads 442 provide power to electrical connectors 430.

Figure 5C:
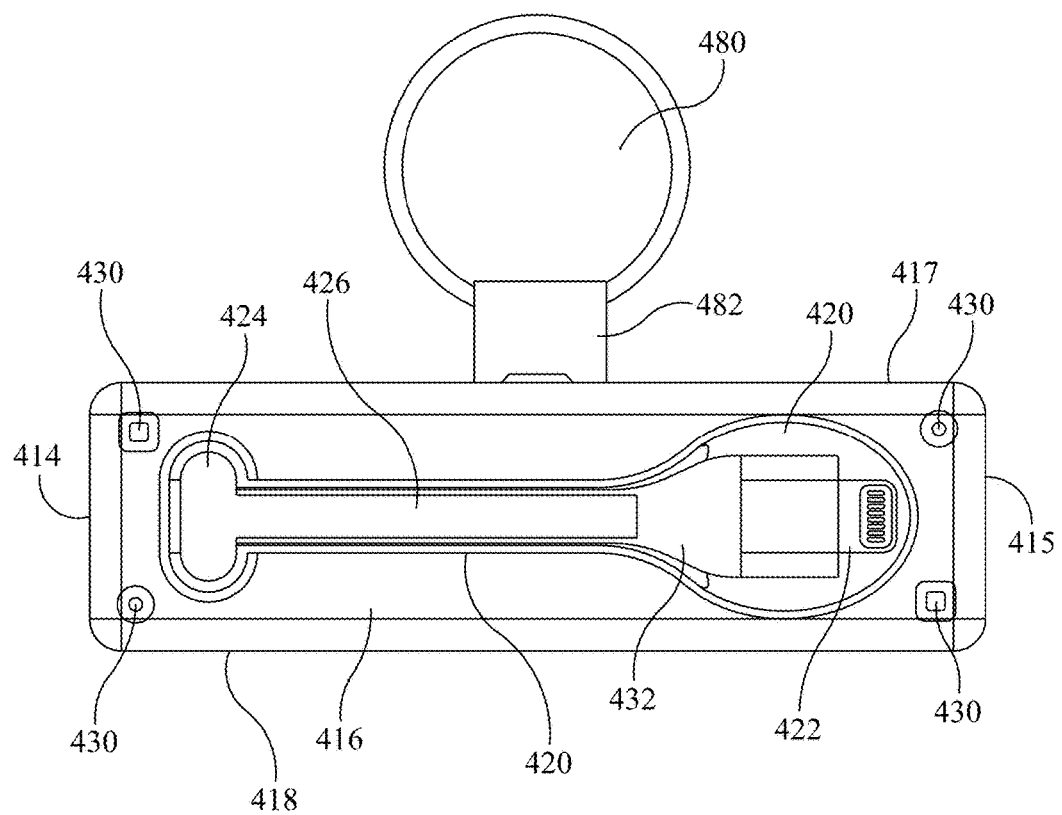
FIG. 5C is a lower view of a portable charger unit for a wearable device in accordance with the present invention.

FIG. 5C shows a wearable device charger 400 useful with the associated components of the present invention. The wearable device charger 400 includes a front wall 410, a top wall 412 (not shown), a left wall 414, a right wall 415, a rear wall 418, and a bottom wall 416. At least one connector cable 420 may be included within the wearable device charger 400. Electrical connectors 430 may be used to the link wearable device charger 400 to other components in the modular charging system of the present invention. As shown, the cable 420 may include a central shaft 426 having a serial connection 438 such as a USB-C connector on the proximal end and a separate connector 422 at the distal end 432, such as a USB or Apple Lightning® connector. The cable 420 may also include a permanent magnet 234 which is attracted to a permanent magnet 236 (as shown in FIG. 3B) mounted within wearable device charger 400 to releasably retain the distal end 432 within the recess 417. The wearable device charger 400 is suitable for charging electronic components such as phones, tablets, readers, and other low-voltage devices via the flexible cable 420. Separate cables may be used so that the wearable device charger 400 may charge devices having different power inputs. The wearable device charger 400 includes charging a support 480 mounted on a damped hinge 482 such that support 480 is depressed briefly to unlock hinge 482 and allow the support 480 to deploy.

Figure 5D:
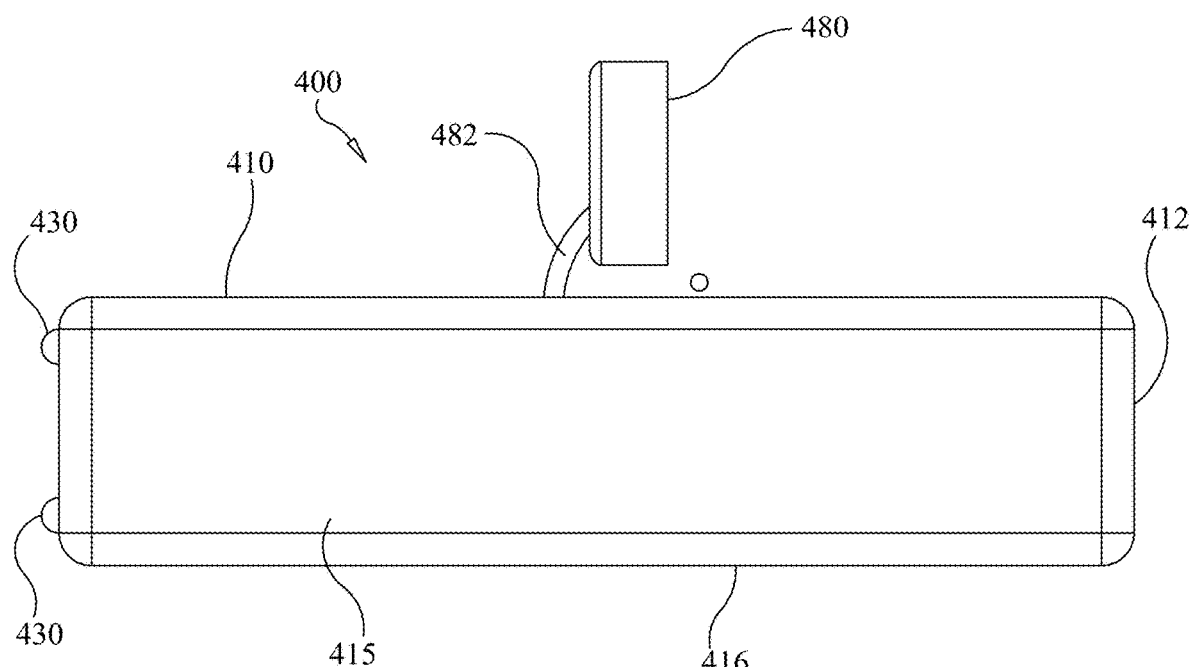
FIG. 5D is a side view of a portable charger unit for a wearable device in accordance with the present invention.

FIG. 5D shows a wearable device charger 400 useful with the associated components of the present invention. wearable device charger 400 includes front wall 410, top wall 412, left wall 414 (not shown), right wall 415, rear wall 418 and bottom wall 416. Wearable device charger 400 includes charging support 480 mounted on a damped hinge 482 such that support 480 is depressed briefly to unlock hinge 482 and allow support 480 to deploy.

Figure 5E:
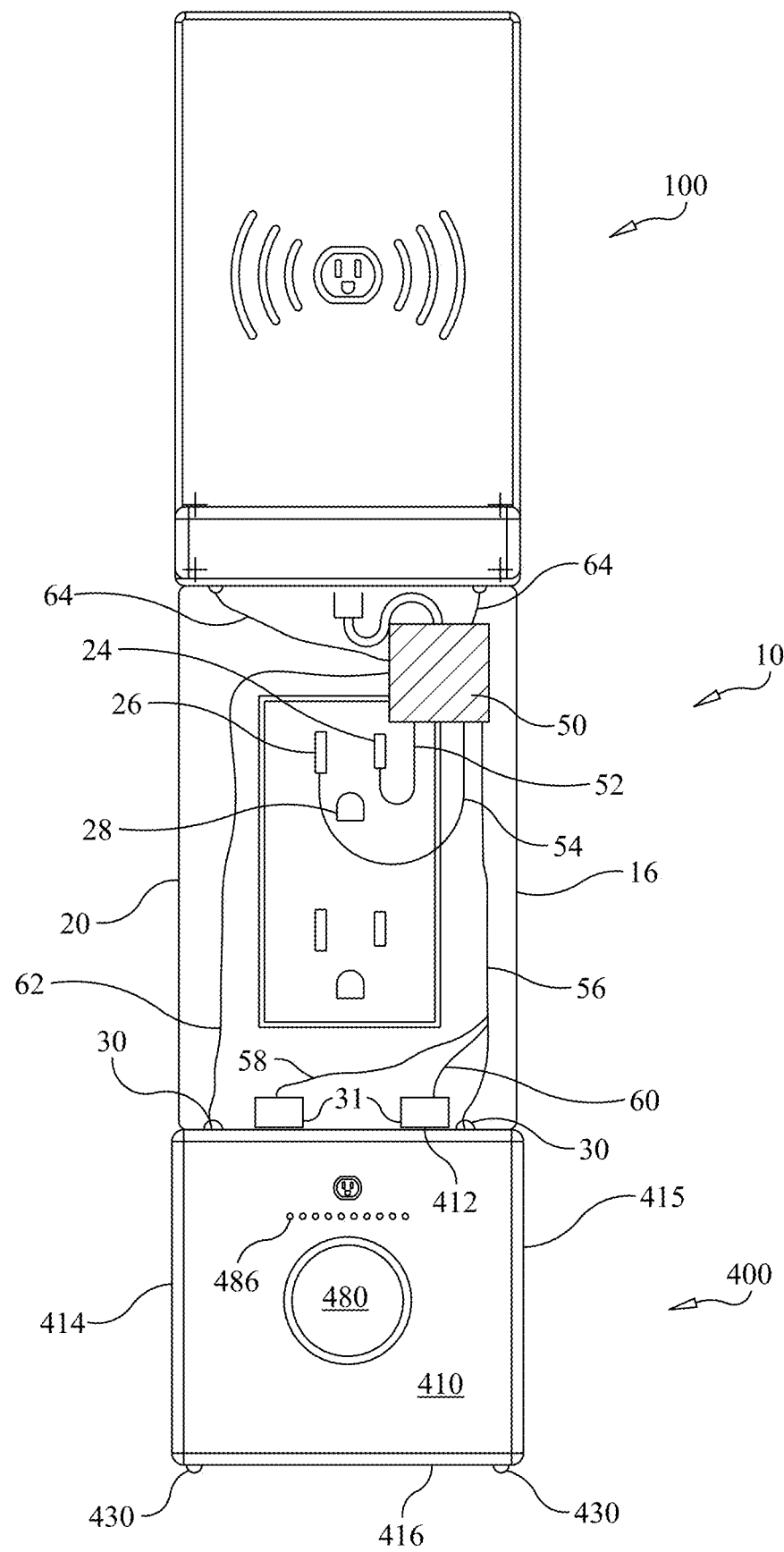
FIG. 5E is a front view and partial schematic of a portable charger unit for a wearable device mounted to the underside of an outlet wall-mounted charging device, with a wireless charge unit mounted to the top side in accordance with the present invention.

FIG. 5E shows a wearable device charger 400 which includes a front wall 410, a top wall 412, a left wall 414, a right wall 415, a rear wall 318 (not shown), and a bottom wall 416. Electrical connectors 430 on the top wall 412 (obscured) are used to link the wearable device charger 400 to the bottom wall 18 of a wall charger 10. The charging device 10 includes a front face 12, a top wall 14, a right-side wall 16, a bottom wall 18, and a left side wall 20. The front face 12 includes an outlet plate that includes two outlets 22, each with a 120V AC "hot" receptacle 24, a neutral receptacle 26, and ground receptacle 28. The connections may be magnetized for secure connection to a charging base or the housing may include magnets for providing the connection. In the event the connector pins are magnetic, it may be useful to have an electronically conducting coating on the pins rather than relying on the magnetic material as the conductor. The housing of the wearable device charger 400 includes corresponding magnets so that the device charger 400 may be removably but securely connected to the charging device. Leads 52, 54 connect the power adaptor 50 to the receptacle 24, 26 and blades 34, 36. The power adapter 50 is also connected to leads 54, 56, 58, 60 and 62 to power the connections 30, 31 on the bottom wall 18. Leads 64, 66 power connections 30 on the top wall 14 and lead 68 powers connection port 72, into which tip 70 may be inserted. Any other low-voltage connections formed in the front face, top wall, sidewalls, or bottom wall may be connected to power adapter 50. Power connections 330 in the wearable device charger 400 connect to power connections 30 in the wall charger 10 to charge the cells within the wearable device charger 400. The wearable device charger 400 may include a permanent magnet in the wearable device charger 400 or each connection 330 may be magnetized to provide a sturdy, but easily removable connection.

Figure 5F:
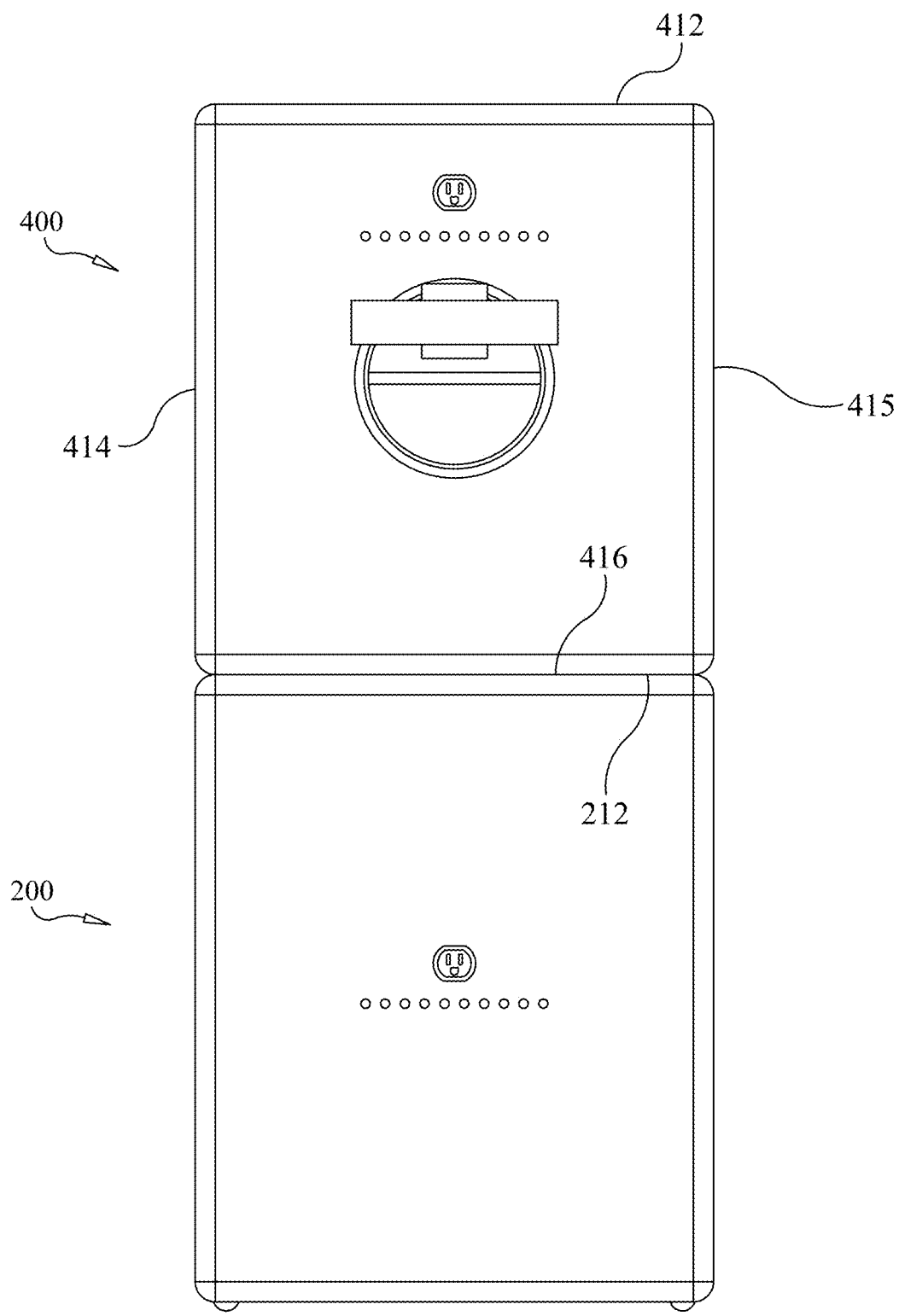
FIG. 5F is a front view of a portable charger unit for a wearable device mounted to a battery block in accordance with the present invention.

FIG. 5F shows a wearable device charger 400 which comprises a front wall 410, a top wall 412, a left wall 414, a right wall 415, a rear wall 418 (not shown), and a bottom wall 416 connected to a battery pack 200. Electrical connectors 430 on the bottom wall 316 (obscured) are used to link the wearable device charger 400 to electrical connectors 230 (also obscured) on the top wall 212 of a battery block 200.

Figure 6A:
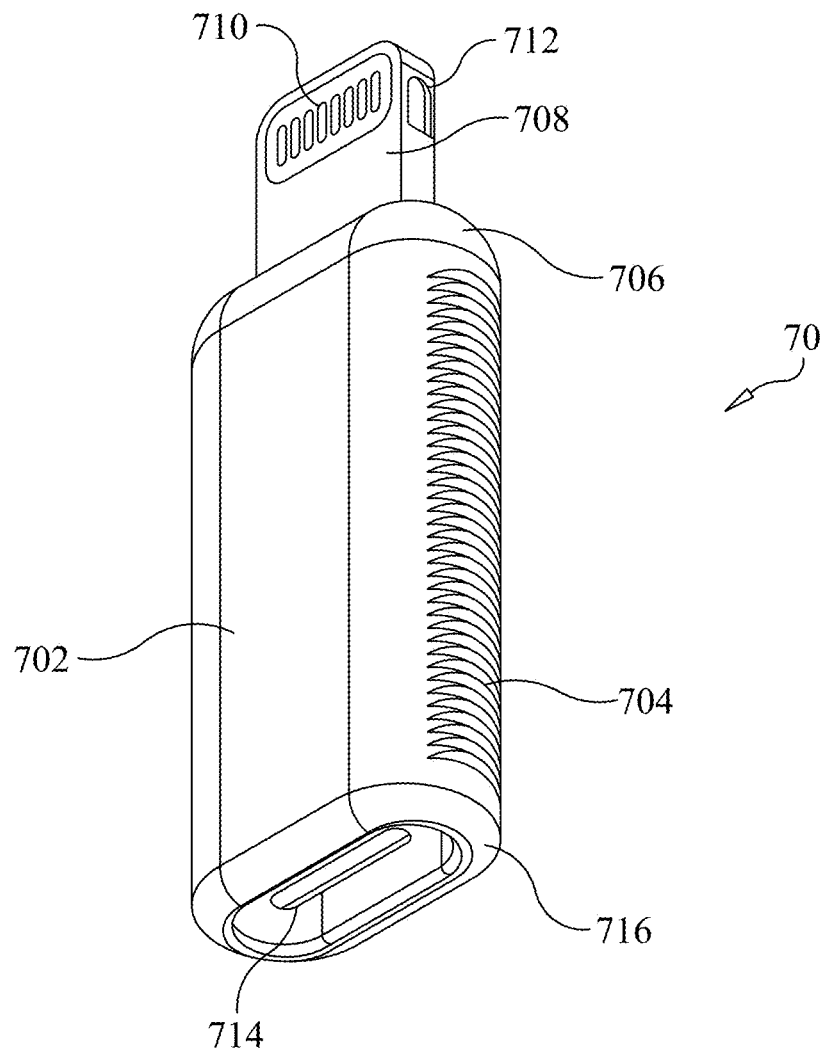
FIG. 6A is a lower perspective view of an Apple Lightning® (Apple, Inc.) style charge tip for use with a wall charger of a modular charging system in accordance with the present invention.

FIG. 6A shows a connector tip 70 for use in the present invention. A charging tip 70 is installed to form a charging dock that allows an electronic device to be placed atop a charging device so that the device is charged in a convenient location without obstructing the outlets on outlet plate. The connector tip 70 includes a generally barrel-shaped body 702 with side sections that include serrated sections 704 which mate to a congruent-toothed section within a receptacle 72 such that a release button 42 (shown in FIG. 1E) disengages the serrated section 704 from the toothed section in the receptacle 72 to allow the tip to be replaced. The tip body 702 includes a bus connection 714 in the lower end and shoulders 716 for ease of insertion into the receptacle 72. Shoulders 706 may also be formed at the upper end of body 702. An Apple Lightning® connector is shown at the upper end of the body 702. The Apple Lightning® connector includes an extension 708 and retention feature 712 and external contacts 710.

Figure 6B:
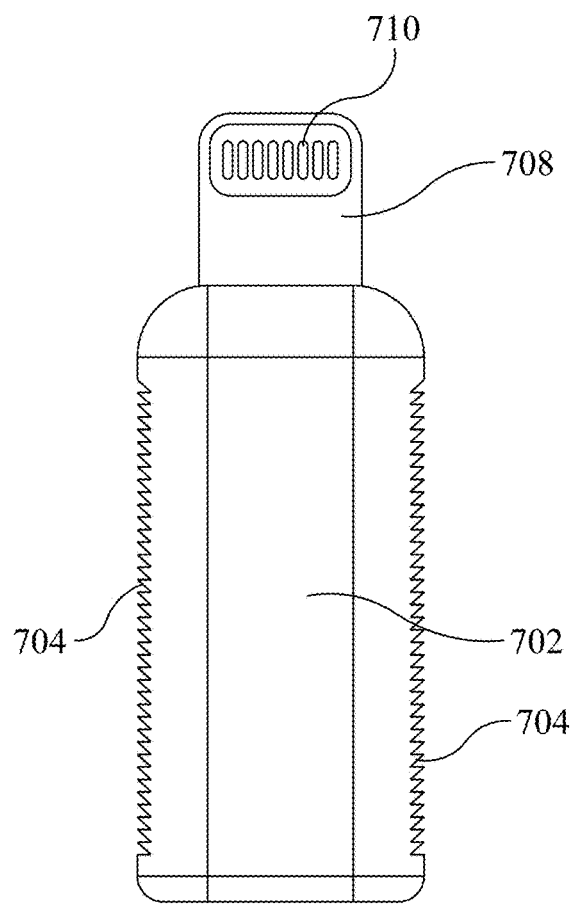
FIG. 6B is an elevation view of an Apple Lightning® style charge tip for use with the wall charger of a modular charging system in accordance with the present invention.

FIG. 6B shows a connector tip 70 for use in the present invention. The charging tip 70 is installed to form a charging dock that allows an electronic device to be placed atop a charging device so the device is charged in a convenient location without obstructing the outlets on outlet plate. The connector tip 70 includes a generally barrel-shaped body 702 with side sections that include serrated sections 704. The tip body 702 includes a bus connection 714 (not shown) in the lower end and shoulders 716 for ease of insertion into a receptacle 72. Shoulders 706 may also be formed at the upper end of the body 702. An Apple Lightning® connector is shown at the upper end of the body 702. The Apple Lightning® connector includes an extension 708 and external contacts 710.

Figure 6C:
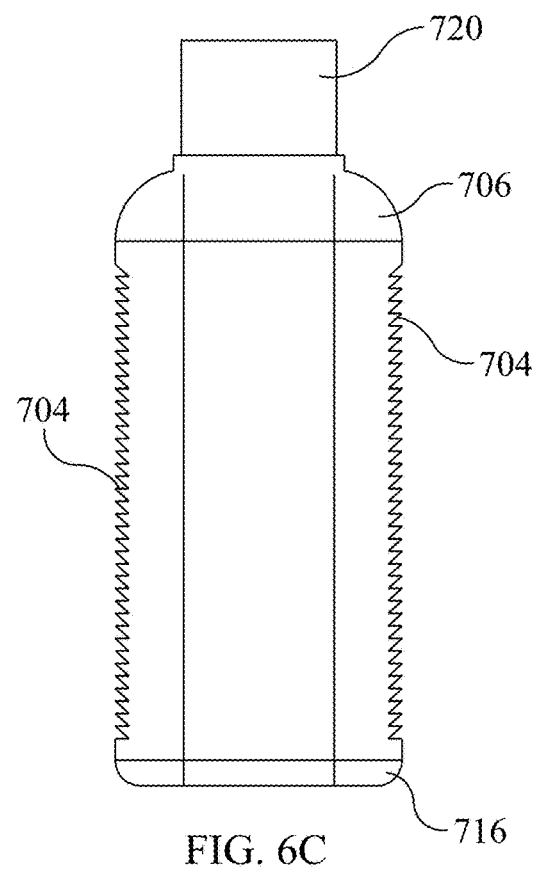
FIG. 6C is an elevation view of a USB-C-style charge tip for use with a wall charger of a modular charging system in accordance with the present invention.

FIG. 6C shows a connector tip 70 for use in the present invention. The charging tip 70 is installed to form a charging dock that allows an electronic device to be placed atop a charging device so that the device is charged in a convenient location without obstructing the outlets on an outlet plate. The connector tip 70 includes a generally barrel-shaped body 702 with side sections that include serrated sections 704. A tip body 702 includes a bus connection 714 (not shown) in the lower end and shoulders 716 for ease of insertion into a receptacle 72. Shoulders 706 may also be formed at the upper end of the body 702. A USB-C connector is shown at the upper end of body 702.

Figure 6D:
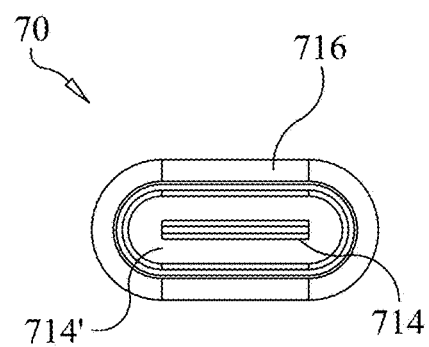
FIG. 6D is a lower view of a charge tip showing a USB-C connector for use with a wall charger of the modular charging system in accordance with the present invention.

FIG. 6D shows the base of a connector tip 70. A tip body 702 includes a bus connection 714 in the lower end and shoulders 716 for ease of insertion into a receptacle 72. A female USB-C connector 714 is shown with a recess 714' surrounding the connection points.

Figure 7A:
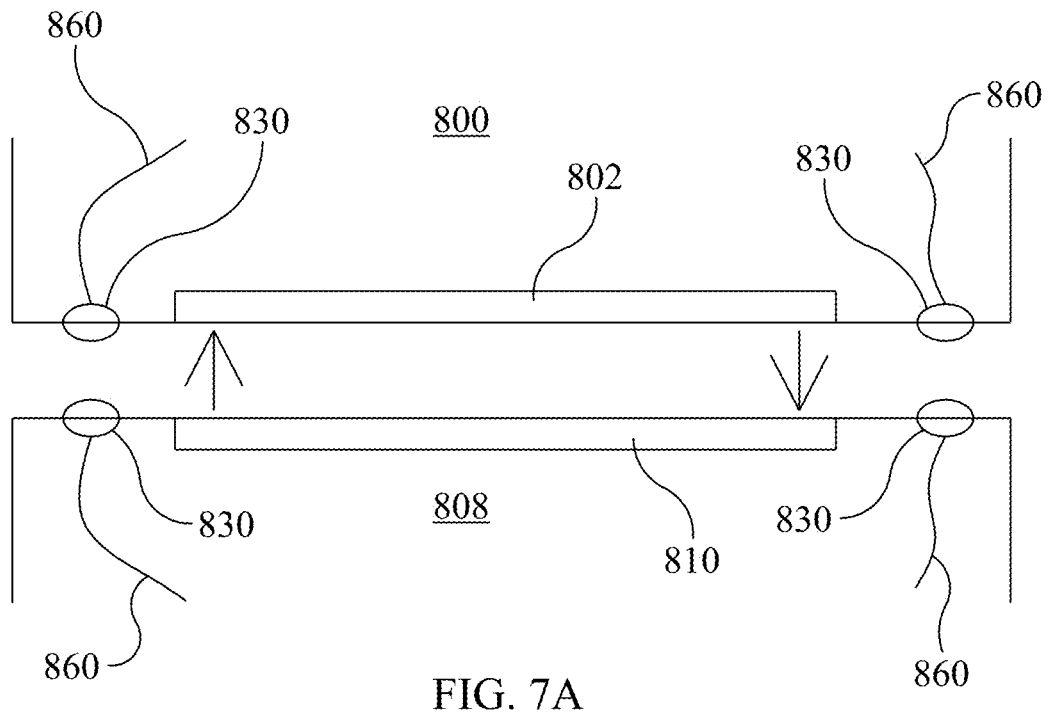
FIG. 7A shows a schematic view of a layout for magnetic attraction between adjacent devices in accordance with the present invention.

FIG. 7A shows a schematic view of one layout for magnetic attraction between adjacent devices in which a first device 800 includes a permanent bar magnet 802, electrical contacts 830, and leads 860 to contacts 830. A second device 808 includes a permanent bar magnet 810, electrical contacts 830, and leads 860 to contacts 830. The arrows show the magnetic attraction between the bar magnets 802, 810 which connects devices 800, 808 in a secure yet easily releasable manner.

Figure 7B:
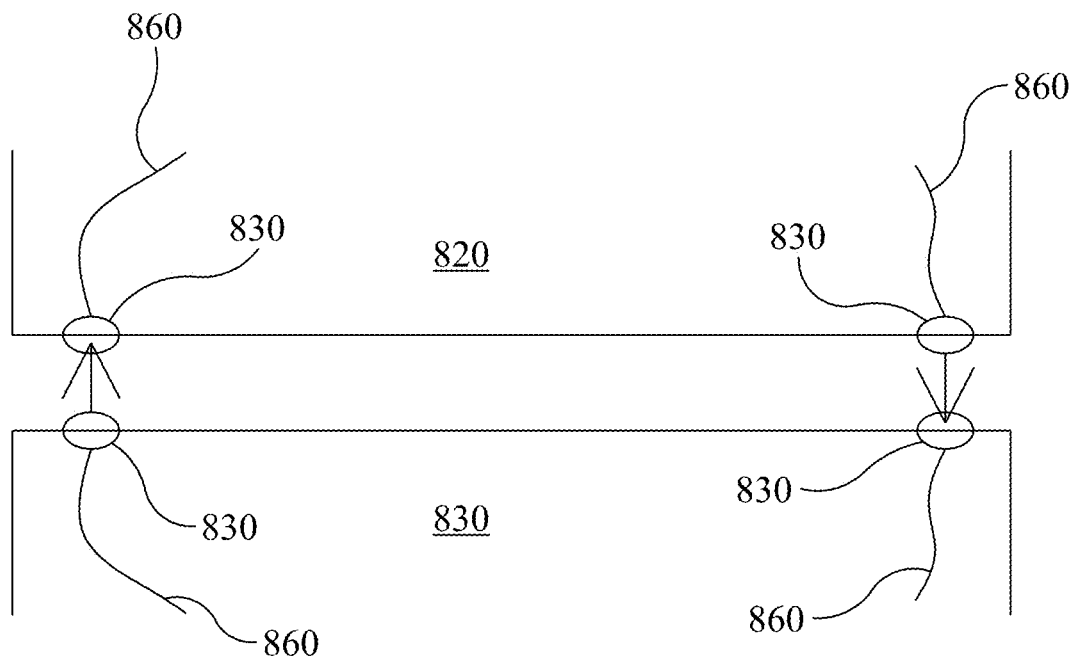
FIG. 7B shows a schematic view of a layout for magnetic attraction between adjacent devices.

FIG. 7B shows a schematic view of one layout for magnetic attraction between adjacent devices in which a first device 820 includes magnetized electrical contacts 830 and leads 860 to contacts 830. A second device 808 includes magnetized electrical contacts 830 and leads 860 to contacts 830. The arrows show the magnetic attraction between the magnetic electrodes 830 which connects devices 820, 830 in a secure yet easily releasable manner.

Figure 7C:
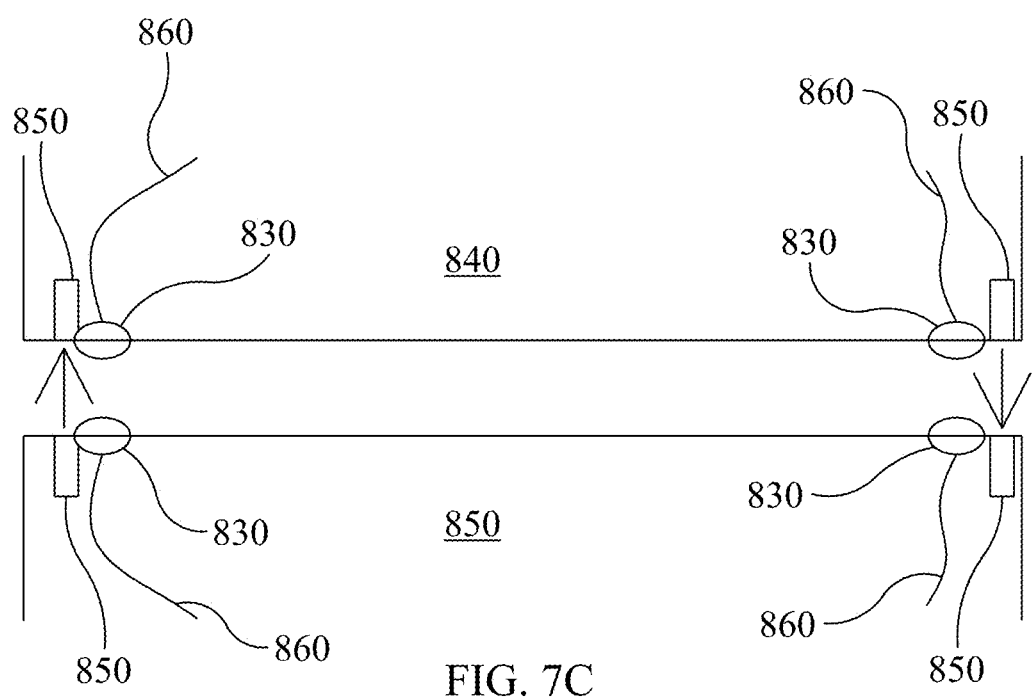
FIG. 7C shows a schematic view of a layout for magnetic attraction between adjacent devices in accordance with the present invention.

FIG. 7C shows a schematic view of one layout for magnetic attraction between adjacent devices in which a first device 840 includes permanent bar magnets 850 located proximate to electrical contacts 830 and leads 860 to contacts 830. A second device 850 includes permanent bar magnets 850 located proximate to electrical contacts 830 and leads 860 to contacts 830. The arrows show the magnetic attraction between the bar magnets 850 which connects devices 800, 808 in a secure yet easily releasable manner.

The present invention allows a number of the devices to be charged simultaneously and allows a number of the devices to be connected to a single charge base.

A pair of USB jacks, which may be received within a base charger unit. Schematic electrical components that connect to electrical contacts in the base surface of the adapter. A portable battery unit may be magnetically attached to the adapter for charging. Leads connect the jacks to a power adapter such as an iWatt iW1691-03 adapter having an AC input of 90-264 VAC and an output of 5V at 2.1 AMPs. Any other suitable power adapter may be used. Leads connect a power adaptor to the contacts on the base of the adapter. A stackable power device may be magnetically attached to the contacts. The jacks may be a standard USB, micro-USB, Apple Lightning®, USB-C, or any other auxiliary cable jack. The contacts may be magnetized for secure connection to a charging base or the housing may include a magnet for providing the connection. In the event the connector pins are magnetic, it may be useful to have an electronically conducting coating on the pins rather than relying on the magnetic material as the conductor. Charge indicators, such as LEDs or LCDs, may be included in the housing to indicate that a connection is made with a charging base or the status of the charge in the stackable power device.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

I claim:

1. A modular system of charging devices configured to be configured to join separate charging devices, the system comprising:
    a first charging device; and
    a second charging device, wherein:
    the first charging device comprises:
        first and second opposed major surfaces and first and second opposed minor surfaces;
        an electrical charging port on at least one minor surface, the electrical charging port adapted to connect to a digital device;
        a magnetic connector suitable for physically connecting the first charging device to the second charging device;
        a first electrical connection for electrically connecting the first charging device to the second charging device;
        a charge storage mechanism electrically connected to the electrical charging port, the magnetic connector, and the first electrical connection;
        at least one electrical connection located on the first major surface; and
        at least one electrical plug extending from the second major surface, and wherein:
    the second charging device comprises:
        first and second opposed major surfaces and first and second opposed minor surfaces;
        an electrical charging port for connecting a digital device on at least one minor surface;
        a magnetic connector adapted to physically connect to the first charging device; and
        a second electrical connection adapted to electrically connect to the first electrical connection of the first charging device.

2. The modular system of charging devices according to claim 1, the modular system of charging devices further comprising a third charging device, the third charging device comprising:
    a base, the base comprising one inclined major surface, the inclined major surface inclined from the base and a second major surface;
    a wireless coil, the wireless coil adapted to electrically charge a digital device proximate the inclined major surface; and
    a magnetic connector adapted to physically connect to the first and second charging devices.

3. The modular system of charging devices according to claim 2, wherein the third charging device further comprises:
    an electrical charging port for connection of a digital device;
    a magnetic connector adapted to physically connect to the first and second charging devices; and
    a second electrical connection adapted to electrically connect to the first electrical connection of the first charging device.

4. The modular system of charging devices according to claim 1, wherein the second charging device electrical charging port is adapted to receive a charging cable.

5. The modular system of charging devices according to claim 1, wherein a first charging device minor surface faces generally upward and comprises at least one of the first charging devices charging ports formed thereon.

6. The modular system of charging devices according to claim 5 wherein an electronic component being charged is supported on the generally upward facing minor surface.

7. The modular system of charging devices of claim 1, wherein the first and second charging devices each further comprises a power manager.

8. The modular system of charging devices of claim 1, wherein the second charging device further comprises at least one wireless charging coil.

9. The modular system of charging devices of claim 1, wherein the second charging device further comprises:
    a battery storage;
    a barrel extension, the barrel extension extending from a first minor surface, the barrel extension adapted for insertion into a vehicle 12V charge port; and
    contacts extending from the barrel to effect an electrical connection with a vehicle 12V port.

10. The modular system of charging devices of claim 9, wherein the second charging device further includes a power cord suitable for electrical connection to a power port of a digital device.

11. The modular system of charging devices of claim 1, wherein the first charging device magnetic connector includes a pair of electrodes for receiving power from a pair of electrodes in the second charging device magnetic connector.

12. The modular system of charging devices of claim 1, wherein the second charging device comprises:
    a charge storage mechanism;
    a power controller connected to the charge storage mechanism;
    at least one connector;
    charge connection pins; and
    a removable connection for securing the power storage device to:
        a charging device; or
        an additional power storage device.

13. The modular system of charging devices of claim 1, wherein the charge storage mechanism is selected from the group consisting of:
    NiCad batteries;
    capacitors;
    rechargeable alkaline batteries; or
    any other electrical storage media.

14. A modular system of charging devices configured to be configured to join separate charging devices, the system comprising:
a first charging device;
a second charging device, wherein:
the first charging device comprises:
first and second opposed major surfaces and first and second opposed minor surfaces;
an electrical charging port on at least of one minor surface, the electrical charging port adapted to connect to a digital device;
a magnetic connector suitable for physically connecting the first charging device to the second charging device;
a first electrical connection for electrically connecting the first charging device to the second charging device;
a charge storage mechanism electrically connected to the electrical charging port, the magnetic connector, and the first electrical connection;
at least one electrical socket located on the first major surface; and
at least one electrical plug extending from the second major surface, and wherein:
a second charging device comprises:
first and second opposed major surfaces and first and second opposed minor surfaces;
an electrical charging port on at least one minor surface, the electrical charging port adapted to connect a digital device;
a magnetic connector adapted to physically connect to the first charging device; and
a second electrical connection for electrically connecting to the first charging device first electrical connection; and
a third charging device, the third charging device comprising:
a base, the base comprising one inclined major surface, the inclined major surface inclined from the base and a second major surface;
a wireless coil, the wireless coil adapted to electrically charge a digital device proximate the inclined major surface; and
a magnetic connector adapted to physically connect to the first and second charging devices.

15. The modular system of charging devices of claim 14, wherein the third charging device further comprises a second magnetic connector adapted to physically connect to the second charging device.

16. The modular system of charging devices of claim 14, wherein the second charging device further includes a power cord adapted to electrically connect to a power port of a digital device.

* * * * *